United States Patent [19]
Baldoni

[11] 4,267,409
[45] May 12, 1981

[54] KEYBOARD DECADE DIGITAL DIAL

[76] Inventor: Carlo Baldoni, 76 Via Villa Musone, 60025 Loreto (Ancona), Italy

[21] Appl. No.: 10,986

[22] Filed: Feb. 9, 1979

Related U.S. Application Data

[63] Continuation of Ser. No. 703,250, Jul. 7, 1976, abandoned.

[30] Foreign Application Priority Data

| Jul. 15, 1975 | [IT] | Italy | 620 A/75 |
| Sep. 25, 1975 | [IT] | Italy | 626 A/75 |
| Apr. 9, 1976 | [IT] | Italy | 48925 A/76 |

[51] Int. Cl.³ .......................................... H04M 1/274
[52] U.S. Cl. .............................. 179/90 B; 179/90 BD; 179/90 K; 179/90 AN
[58] Field of Search ............ 179/90 B, 90 K, 90 AN, 179/90 BD, 81 C; 363/59, 60

[56] References Cited

U.S. PATENT DOCUMENTS

| 3,489,860 | 1/1970 | Greenman et al. | 179/81 C |
| 3,932,709 | 1/1976 | Hoff et al. | 179/90 K |
| 3,956,596 | 5/1976 | Connolly et al. | 179/90 K |
| 3,980,837 | 9/1976 | Jakobsson | 179/90 K |
| 4,008,380 | 2/1977 | La Borde | 179/90 K |
| 4,032,722 | 6/1977 | Connolly et al. | 179/90 B |
| 4,039,761 | 8/1977 | Nicoud et al. | 179/90 B |

*Primary Examiner*—Gerald L. Brigance
*Attorney, Agent, or Firm*—Cushman, Darby & Cushman

[57] ABSTRACT

A decade digital telephone dial which is controlled by means of a keyboard is positioned in place of a conventional rotary dial in a standard telephone unit. An electronic circuit is provided for converting the information keyed into the telephone unit by the keyboard to signals for transmittal from the telephone unit to a called party and for storing as well as displaying telephone numbers keyed into the keyboard unit. The circuitry includes a power supply for converting telephone line current to AC and DC voltages useful in operating the telephone unit. A control circuit controls the transmission of line pulses as well as the storing of information for later use if it is desired that the telephone number be retransmitted in coded form without rekeying or dialing the telephone number. A display is provided for displaying the telephone number called to insure the accuracy of the number and to decrease the time involved in placing telephone calls.

25 Claims, 37 Drawing Figures

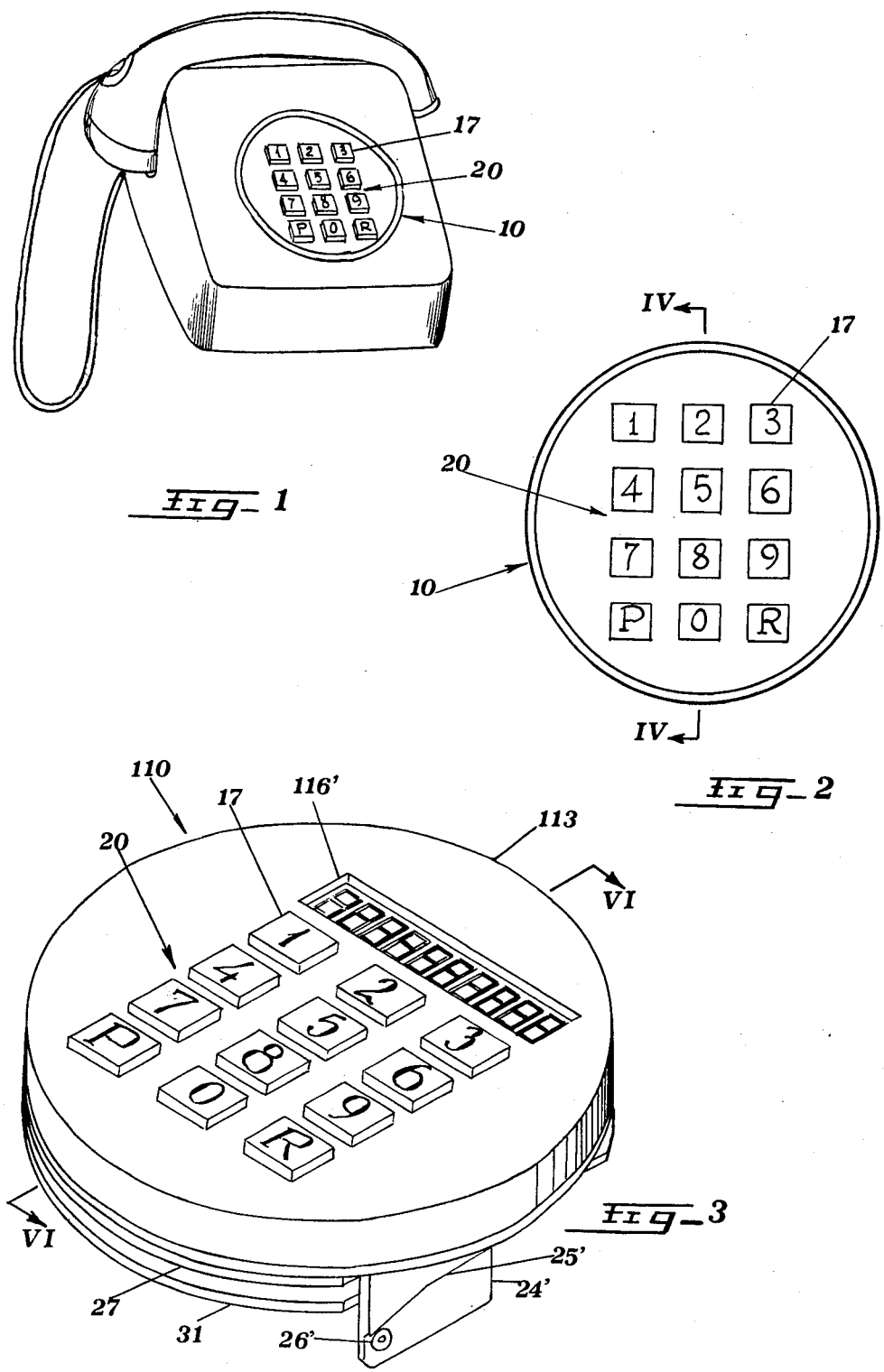

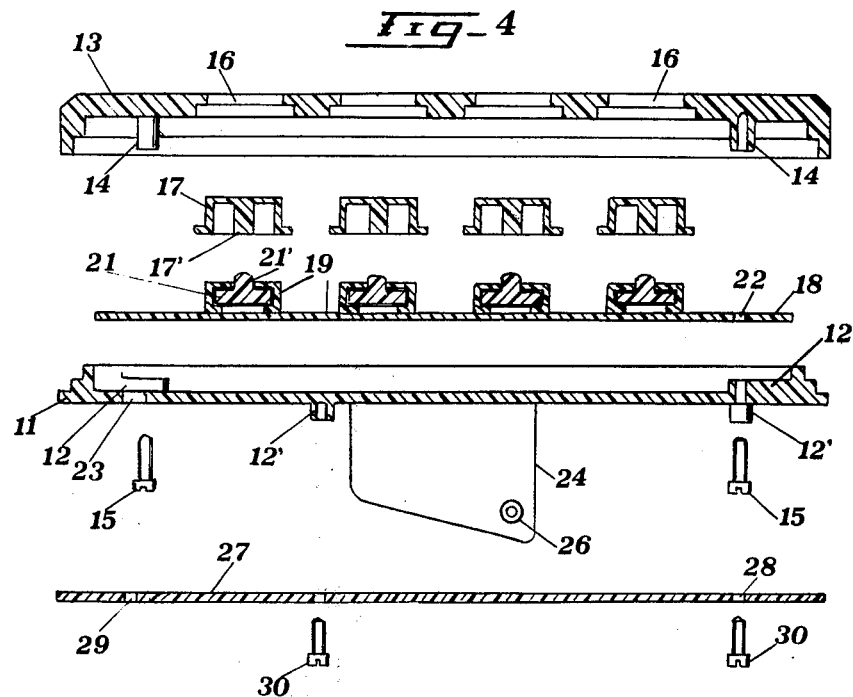
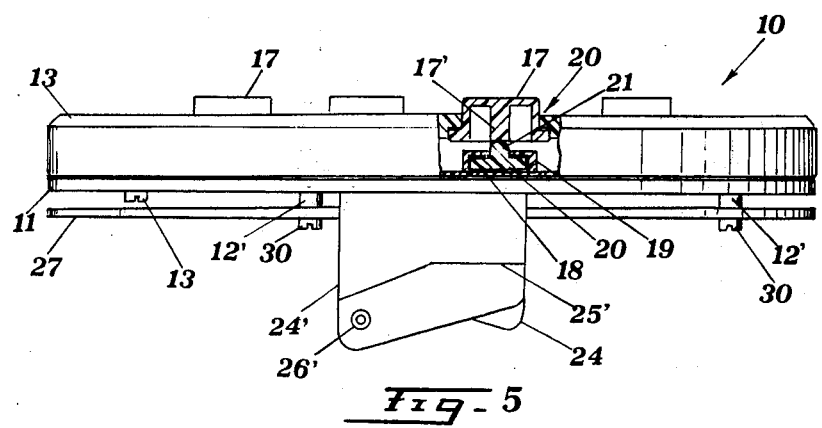

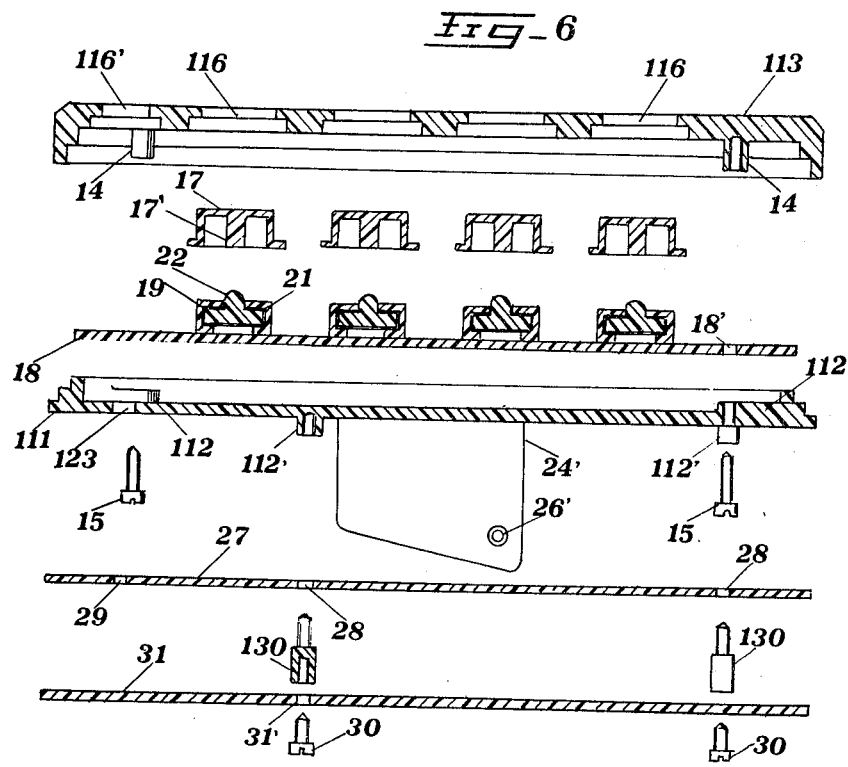
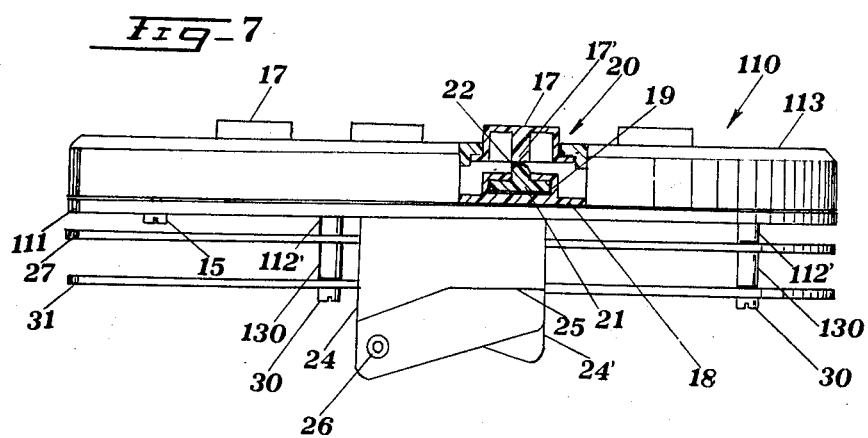

BLOCK SCHEMATIC

FIG _ 11

CLOCK WAVEFORMS

RESET and COMMON INPUT TIMING

OUTPUT TIMING

ACCESS PAUSE TIMING

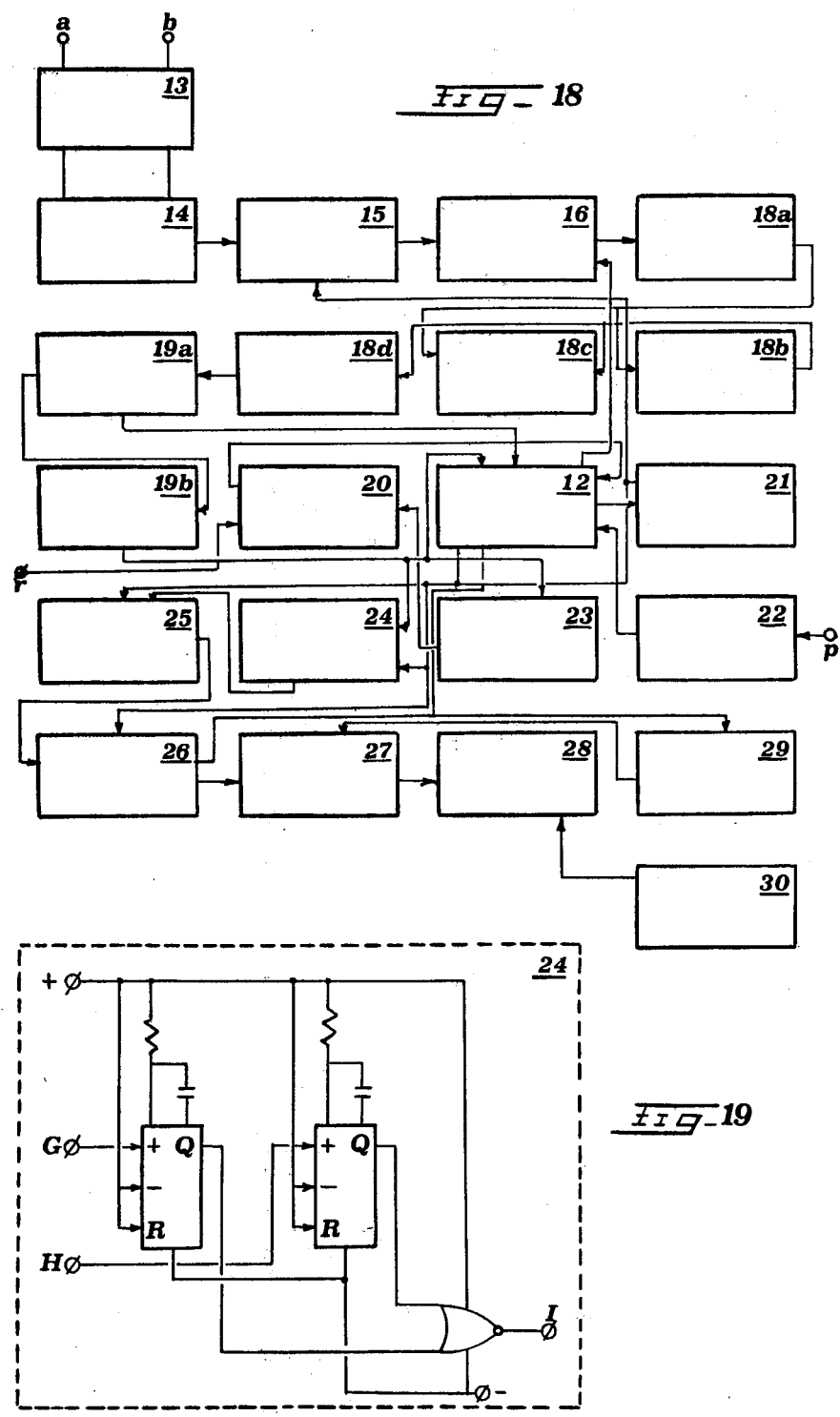

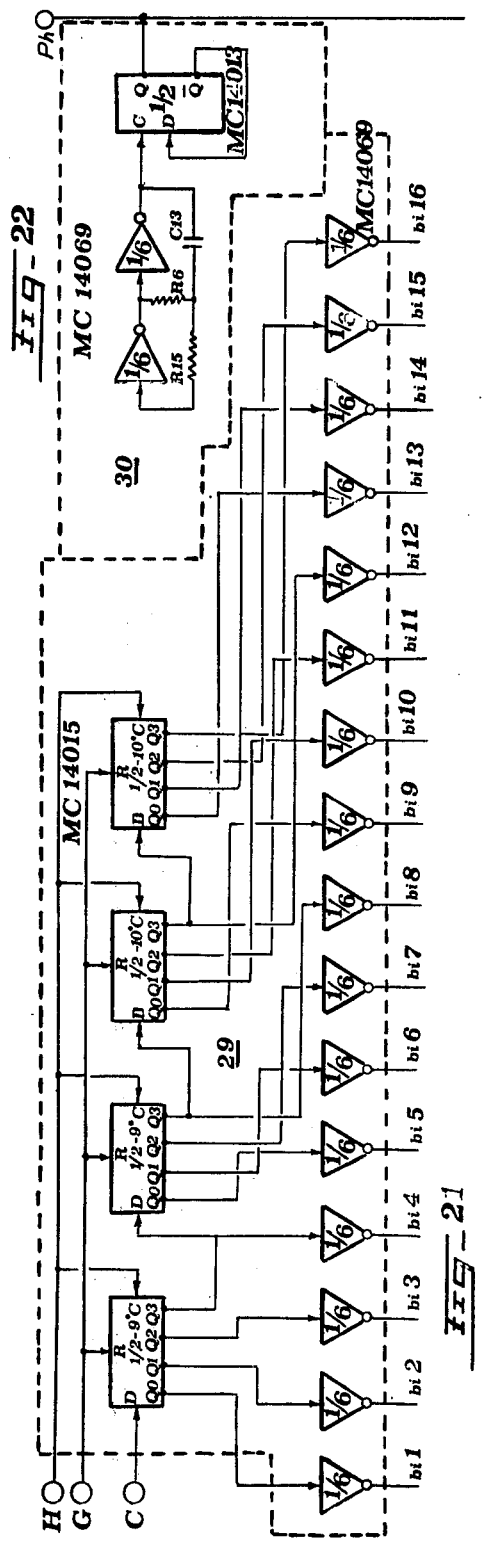

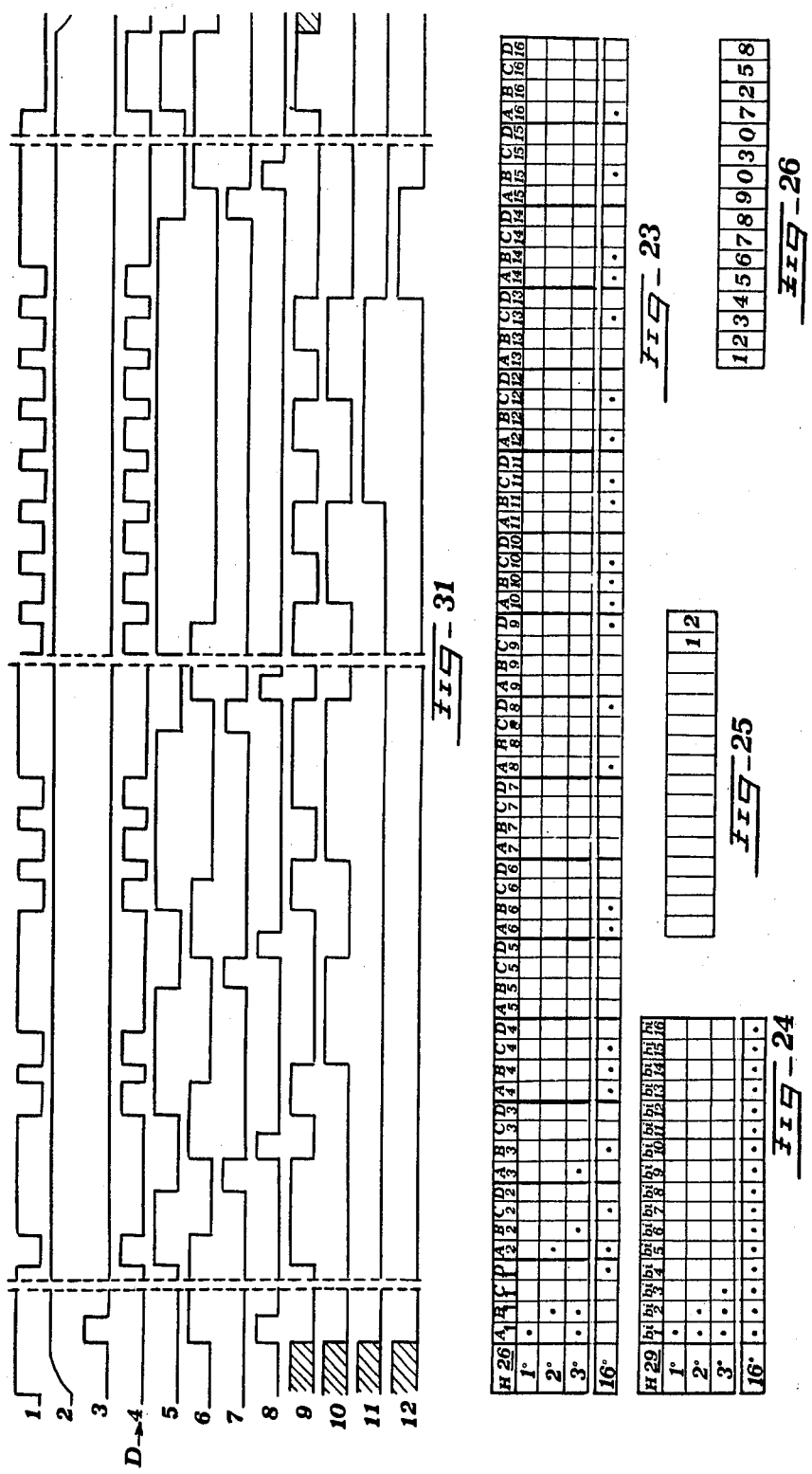

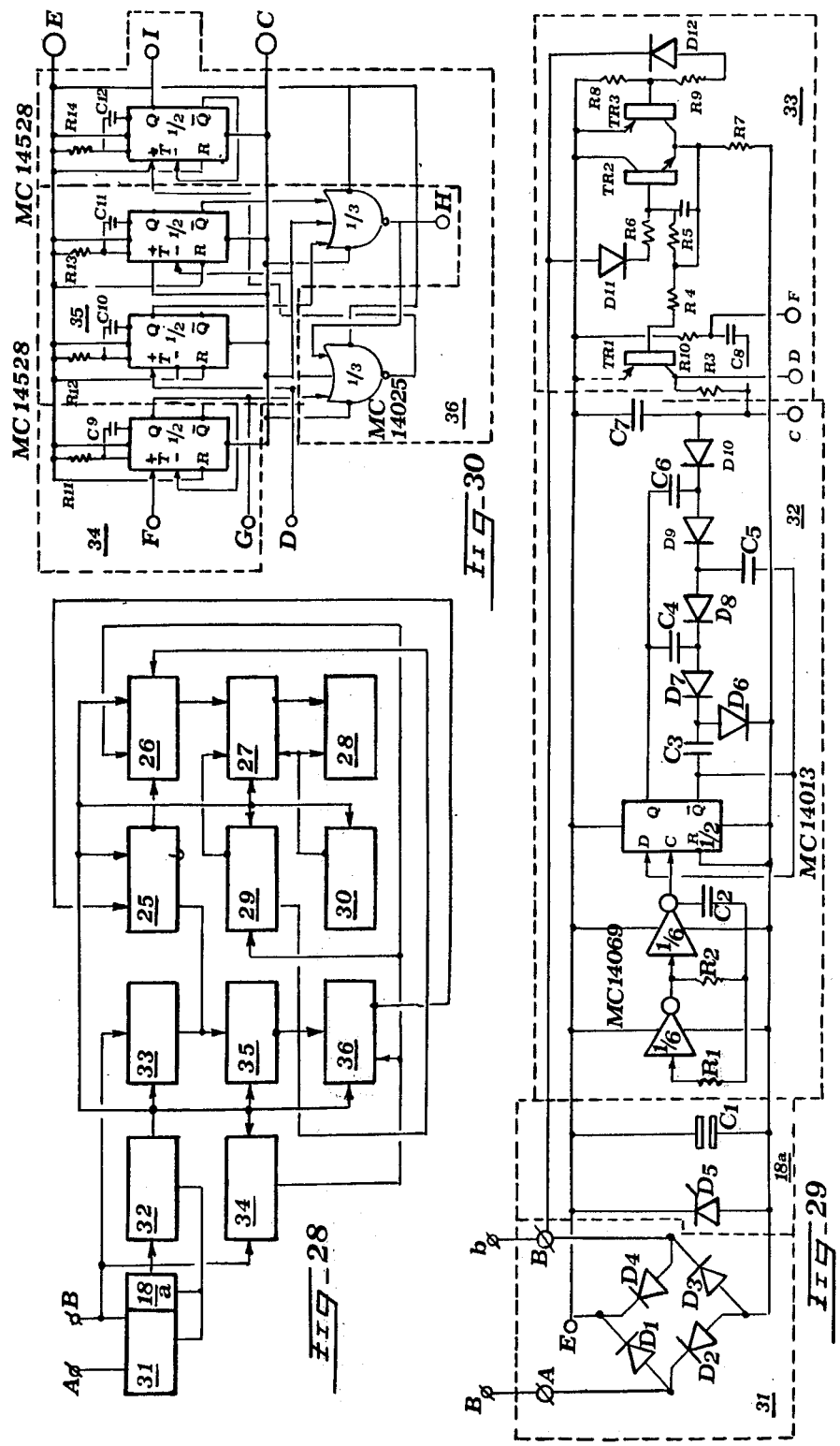

KEYBOARD DECADE DIGITAL DIAL

This is a continuation of application Ser. No. 703,250 filed July 7, 1976, now abandoned.

BACKGROUND OF THE INVENTION

Automatic telephones are well-known which have dials which are provided with a mechanical, rotary finger-plate for dialing a number to be called, i.e., the prior art dials of automatic telephones are nearly exclusively of a mechanical and rotary type for dialing a number. The dials have a mechanical delay after which the telephone number must be dialed when the line is engaged.

To improve the operative features of a telephone having such a prior art dial, some solutions have been proposed and tried. For example, the use of mechanical means has been proposed to overcome the supply delay, and electromagnetic means have been employed to open and close the telephone line at the moment pulses are sent thereon. Some drawbacks have, however, been found which are connected with these proposed improvements, for example, the different set-up caused by the influence of the elastic characteristics of the materials being used for a mechanical delay, or rod jamming of the relays being employed in electromagnetic devices, or further need of a well-defined position of the telephone apparatus or some parts of same when devices with mercury wetted contacts are employed.

The application of electronic circuits has also been tried. At present these solutions to a telephone apparatus are less than desirable since the circuits must be specifically designed and manufactured in its entirety, i.e., both the dialing device and the telephone case with its electrical circuits must be changed in respect to a conventional telephone, while the substitution of an improved electronic dial only for a conventional dial of the mechanical rotary type has not yet been considered.

It will be understood that such a substitution is really very important because of the actual enormous distribution of automatic telephones. For the same reason the keyboard control system for dialing a telephone number, while pertaining to these electronics solutions of the problem, could not previously be considered satisfactory by itself, if a large production of same is desired.

Referring to the visible display of a called number, it is further pointed out that such a feature is very important in a telephone when the called number is displayed as the keys relating to the component digits thereof are sequentially depressed by the user, or as the correct selection sequence of said component digits occurs at the telephone exchange. In accordance with the above considerations, such a feature may also be very important when the visible display device is a part of the dial wherein the electronic circuit systems are included for the operation of the telephone.

It will be understood, by those skilled in the art, that through inattention and/or wrong operation of the telephone apparatus, a number may be dialed which is different from the number to be called. Thus, not only with the caller have an actual loss of money due to the wrong telephone call, such a loss being as great as the distance to the called subscriber by direct dialing increases, but there is also time loss for both telephone users, the former of which needs to dial again the number. On the other hand, in accordance with known techniques, the exactitude of a dialed number could until now only be controlled through a confirmation which is phonically received by the called subscriber.

SUMMARY OF THE INVENTION

The main object of the present invention is then to solve in the most satisfactory manner the problem of substituting a novel decade digital telephone dial controlled by means of a keyboard in place of a conventional dial having a mechanical rotatable finger-plate, said novel telephone dial being provided with an electronic circuit system which may give the user particular, important advantages the eliminate the aforementioned drawbacks.

Another object of the present invention is to provide the telephone dial with an electronic circuit system capable of giving the user not only those advantages which relate to a keyboard control, but also the visible display of a called number during the dialing of same by sequentially depressing the keys which correspond to the component digits.

In substance, in this novel decade digital telephone dial according to a first embodiment thereof, wherein a keyboard is provided to dial a telephone number without visible display, the following innovative features are pointed out:

(1) the possibility of substituting this novel electronic dial for a dial of a conventional telephone wherein a mechanical rotatable finger-plate is provided;

(2) no relay is used in the circuits thereby avoiding those drawbacks which could be caused by same;

(3) the possibility of electrically connecting the electronic circuit system of this new keyboard dial to the terminal board of said conventional telephone;

(4) telephone number dialing by means of said keyboard at a speed which is independent of the digit emission speed;

(5) the possibility of containing and storing twenty called numbers of many component digits;

(6) independence of the delay of the line power supply of the elasticity of mechanical means being used, e.g., spring elasticity, which could affect the apparatus operation because of wear, such delay being performed in dependence only on the electronic circuits;

(7) the electronic device has by itself a low power consumption so that it may be supplied power directly from the telephone line and a rational interchangeability of the apparatus may be achieved;

(8) the possibility of repeating as many times as necessary a telephone number to be called after it has initially been dialed. When the line is engaged, it is not necessary to dial again that number because the electronic portion of the novel dial allows the storage of the called number and a contemporary opening of the line when a proper key of the keyboard is depressed, the repetition of the number being possible by only depressing the proper key;

(9) the possibility of generating line control pulses in accordance with the standards of the various communications authorities.

When a display device is provided in accordance with a second embodiment of the present invention, the following features must be added:

(10) control by means of calling pulses which are consecutively passed on the lines, which pulses correspond to the component digits of a number to be called, so that either a wrong dialing of one or more digits, or the missed selection of same by the telephone exchange, or the wrong dialing of the number in its whole may be simultaneously visibly displayed, before the count operation of the exchange counter;

(11) no waiting for a reply by the called subscriber is thus necessary to confirm that the dialed number is accurate; some time may then be saved for repeating the number dialing process, and the charge for a wrong called number will be saved as this number will not have been counted;

(12) the possibility of avoiding useless engagement of the telephone line caused by a wrong dialing, as well as the time loss of any other subscriber which needs to use a telephone;

(13) a greater probability of recalling in a shorter time, the right number, that is, to find the line which is not in use, which may be very important when the phone traffic is large.

The above features of the present invention as well as the advantages of its application to automatic telephones may be better understood by those skilled in the art when reference is made to the following description take in conjunction with the accompanying drawings. The description and drawings relate to some illustrative examples of preferred embodiments of the invention and are not a limitation of same and were selected for a decade digital telephone dial the electronic system of which is controlled by a keyboard. Such a telephone dial may be with or without a visible display device. The visible display device, on the other hand, is provided as independent but connected to the electric circuit of a telephone.

DESCRIPTION OF FIGURES

FIG. 1 is a diagrammatic assembly view of a conventional telephone apparatus wherein the dial having a finger-plate has been replaced by a keyboard dial with a decade digital electronic system in accordance with a first embodiment of the present invention;

FIG. 2 is a diagrammatic front view of a telephone dial with keyboard, in accordance with the first embodiment of the invention;

FIG. 3 is a diagrammatic perspective view of a keyboard dial with a decade digital electronic system in accordance with a second embodiment of the present invention, wherein a visible display device is also provided;

FIG. 4 is a sectional exploded view taken along diametrical line IV—IV of FIG. 2;

FIG. 5 is a partially cutaway side elevation view of the electronic telephone dial of FIG. 4 after the single component pieces thereof have been assembled;

FIG. 6 is a diametrical section view similar to FIG. 4, relating however to an electronic dial with a visible display device and taken along line VI—VI of FIG. 3;

FIG. 7 is a partially cutaway side elevation view of the electronic dial of FIG. 6 after the single component pieces thereof have been assembled;

FIG. 7 is applied in place of a mechanical rotatable dial, the apparatus case being partially cutaway to show the most important electric connections;

FIG. 18 shows the schematic electronic block diagram of a second embodiment of the present invention wherein a visible display device is also provided;

FIG. 19 illustrates the detailed schematic electronic diagram of section 24 of FIG. 18;

FIGS. 20 to 22 are the detailed schematic electronic diagrams of the other sections of FIG. 18 particularly relating to said display device;

FIG. 23 shows in a table the conditions of the several control outputs of block 26 of FIGS. 18 and 20;

FIG. 24 shows in a table the operative conditions of the several outputs of section 29 of FIGS. 18 and 21;

FIGS. 25 and 26 are diagrammatic views of a visible display wherein only two and all the component digits, respectively, of a number to be called are shown;

FIG. 28 is a block diagram of a visible display device circuit according to the present invention, such display being an independent device which is connected to two terminals of the terminal board of a conventional telephone;

FIGS. 29 and 30 show the schematic electric diagrams of sections 31 to 36 as provided in this illustrative example of embodiment;

FIG. 31 shows the several waveforms of a display in accordance with this latter embodiment.

DETAILED DESCRIPTION OF THE PREFERRED EMBODIMENTS

Figure 8:
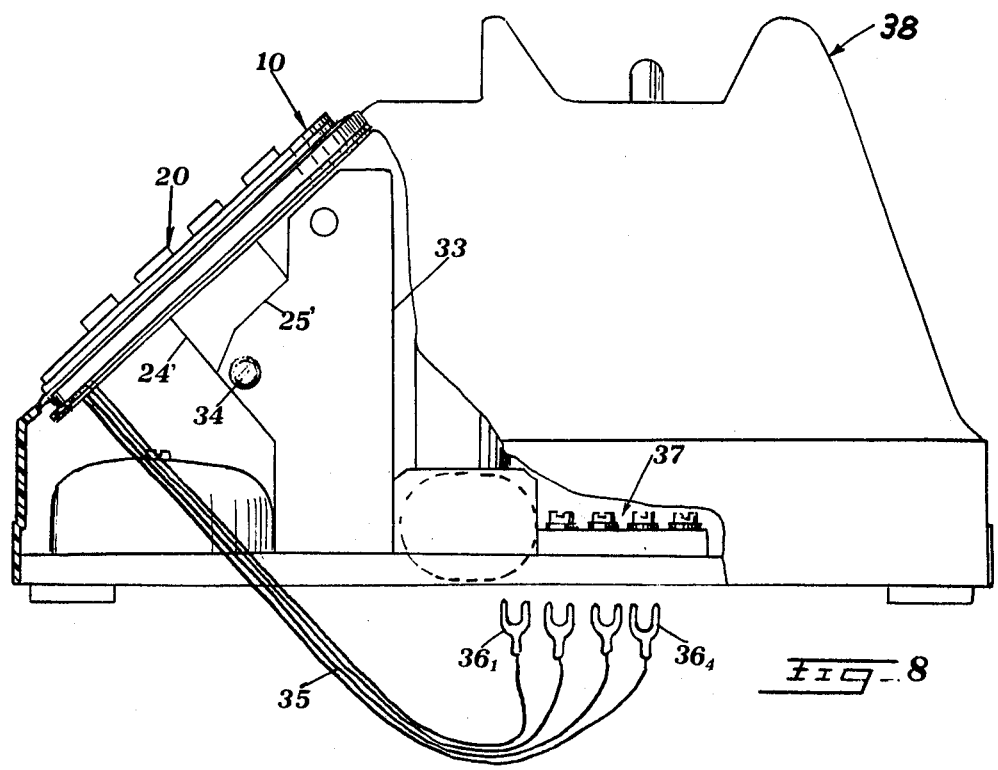
FIG. 8 is a side elevation view of a conventional telephone wherein the electronic dial of FIG. 5

Referring now to the drawings and particularly to the first embodiment of FIGS. 1, 2 and 4, 5. In FIG. 1 a conventional telephone is shown, wherein the dial with mechanical rotatable finger-plate is replaced by a keyboard electronic dial. A frontal view of this dial is shown in FIG. 2, while detailed exploded and assembly views, respectively, are shown in FIGS. 4 and 5.

As regards the illustrated example of this first embodiment, a decade digital telephone dial generally indicated by the reference numeral 10 comprises a shallow base 11 from the inner bottom of which are peripherally protruding solid members 12, with through-holes to be used for connecting base 11 to its cover 13. From the inner surface of the cover 13 are solid coaxial members 14 having threaded holes which protrude downwardly so that base 11 and cover 13 may be fastened therebetween by means of screws 15 which pass through said holes of members 12 and are threaded in members 14 of cover 13. Any other similar connecting means may obviously be used, if desired.

Openings 16 are provided in cover 13, the shape of which matches with the outline of flanged keys 17, so that the keys may pass through the openings 16 and stick out sufficiently from the cover to be easily depressed by the user when a telephone number is to be dialed or when a special function of the electronic device is to be carried out as allowed by the electronic circuit system in accordance with the details which will be discussed hereafter.

The inner portion of each key 17 is provided with a central pin 17' against the bottom edge of which a coaxial resilient pin 22 is usually pushing so that the key sticks outwardly of the upper surface of cover 13. Resilient pin 22 has, on the other hand, a member 21 seated within a protruding hollow member 19 of a first printed circuit board 18. It is to be noted here that the member 21 relates to a known switch having two particularly shaped thin metal sheets which are spaced and electrically insulated with respect to each other to form a switch with a sealed air chamber, the switch being normally in its OFF state, and turned ON when the key 17 is depressed by the user. In this manner, a continuous contact between facing coaxial pins 17' and 22 is always ensured, and any eventual bounce during depression of key 17 is avoided both by the resilience of pin 22 and the deformation resistance of the air within the sealed chamber.

While these switches are commercially-known, the use of its features has been preferred in this novel electronic telephone dial with control keyboard.

Figure 12:
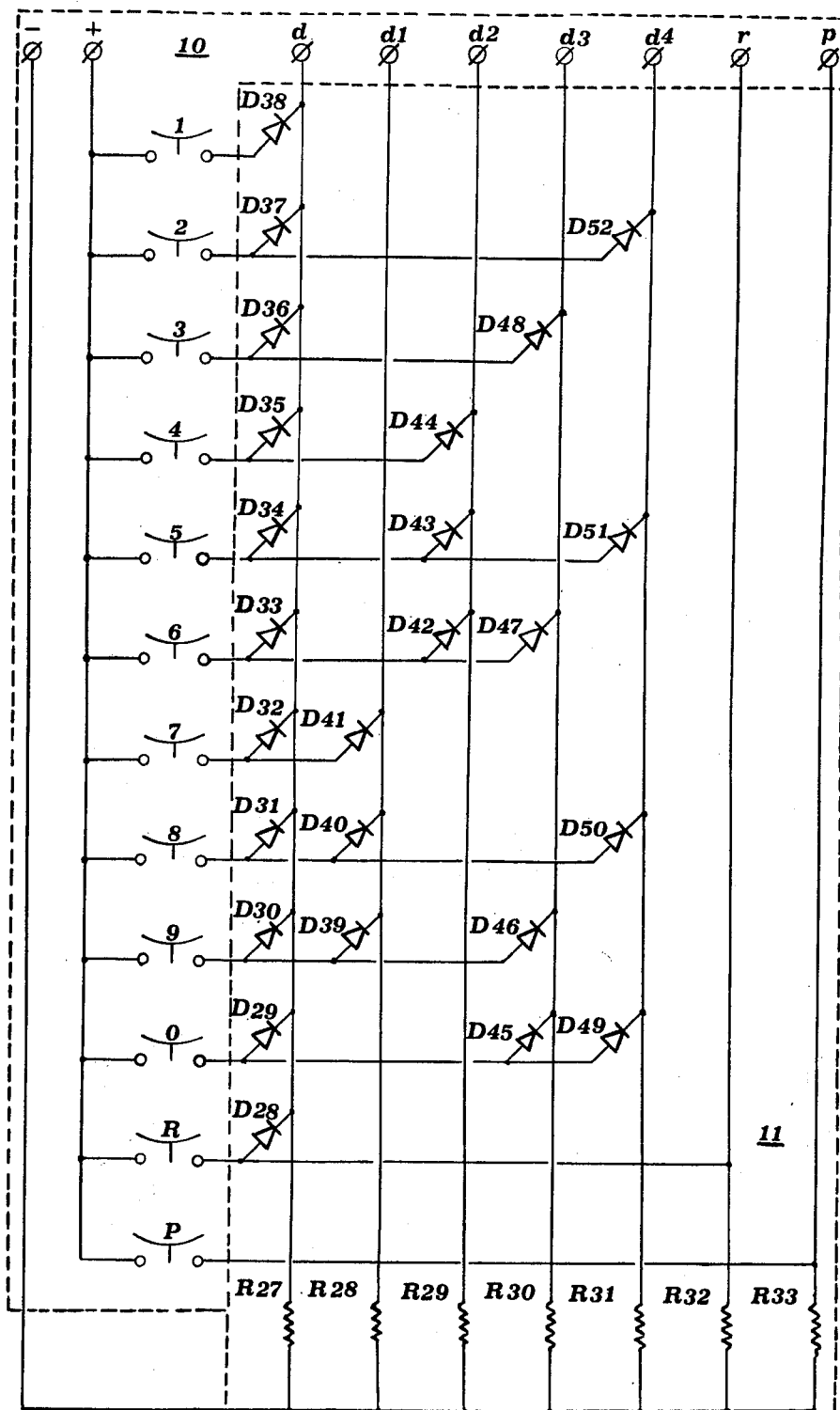
FIG. 12 is the detailed schematic electronic diagram of the control keyboard of the first embodiment of the invention.

As regards printed circuit board 18, a fiberglass plastic is preferred, which is provided with twelve switches of the above type corresponding to the twelve keys 17 of keyboard 20 (see FIG. 12).

The printed circuit board 18 is electrically connected to the general electronic circuit system of a second board 27 and the connectors (not shown) pass through an elongated opening 23 at the bottom of base 11 of the case comprising base 11 and cover 13. On the other hand, as illustrated in FIGS. 4 and 5, the second board 27 can be mounted on the outside edge of the protruding pins 12' of base 11 and may be fastened thereon, for example, by means of screws 30, so that such a board 27 is positioned below and spaced from base 11.

With respect to the novel interchangeable electronic dial 10 in accordance with the present invention, it should be recalled that the base 11 is provided with two diametrically opposed ears 24, 24' which sufficiently protrude downwardly and are so shaped at 25, 25' that they may be mounted on likely shaped standards 33 of a conventional telephone apparatus (see FIG. 8). Screws 34 are provided to fasten the telephone dial 10 to said standards 33 in place of a conventional rotatable dial. For this purpose screws 34 are screwed in threaded holes 26, 26' of the ears 24, 24'.

In accordance with this embodiment, the second board 27 with its general electronic circuit system, is placed between the ears 24, 24'.

In FIG. 8 there is illustrated a first important feature of the electronic telephone dial 10 according to the present invention, namely, the possibility of an easy and simple substitution of same in place of the conventional dial. The importance of this substitutibility is due to the fact that the particular decade digital electronic circuit system designed for the novel dial 10 permits only four connecting wires at the output of the system, these wires being provided with lugs $36_1$ to $36_4$ to be fastened at the terminals of a common terminal board 37 of a conventional telephonic apparatus 38. Details of the connections are shown in FIGS. 13a which may be compared with the connections usually provided for the electric circuit of a conventional telephone, as shown in FIG. 13.

Figure 13:
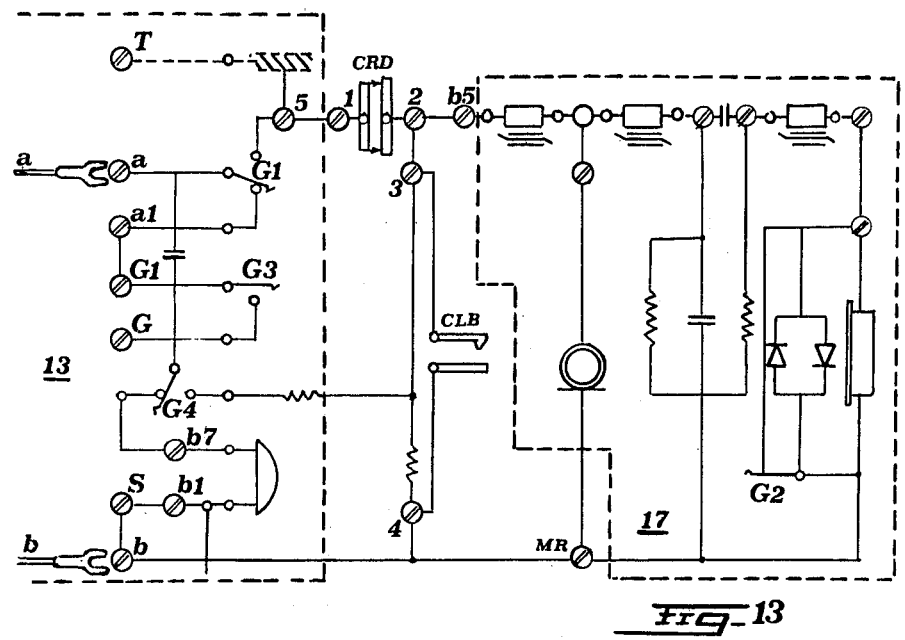
FIG. 13 is a schematic electric diagram of a conventional telephone.
Figure 13A:
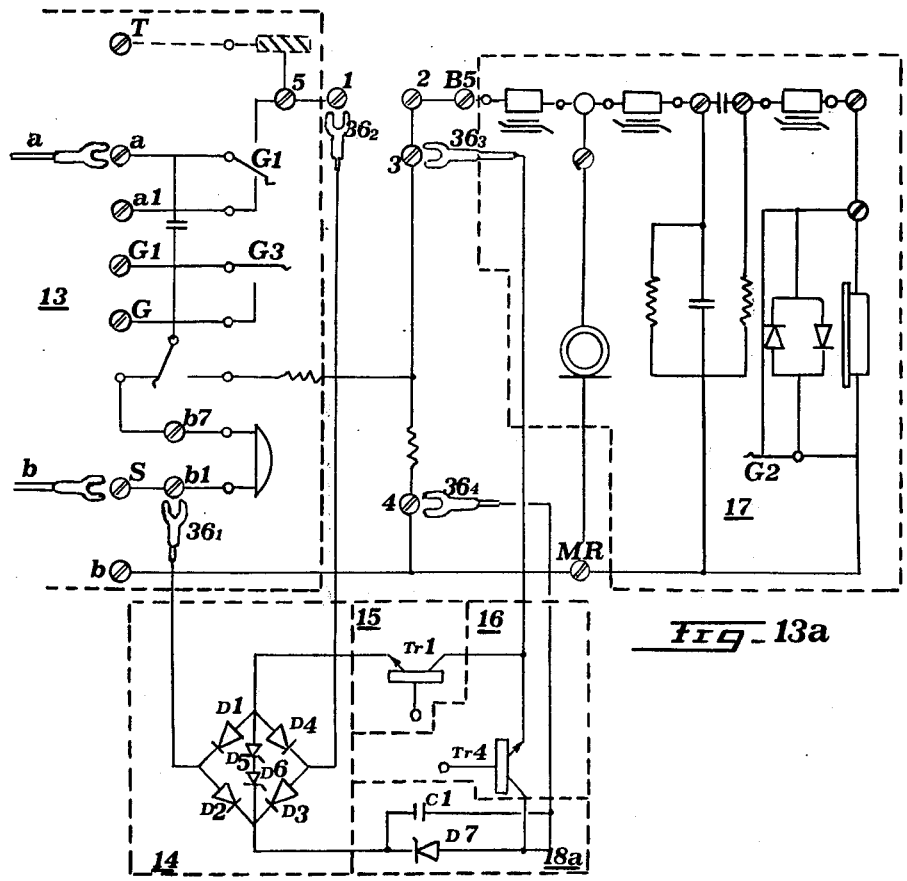
FIG. 13a is a schematic electric diagram of a telephone wherein connections are provided with the electronic system of a keyboard dial according to the present invention which replaces a conventional mechanical rotatable dial.

In substance, those skilled in the art may easily note that common switches CRD and CLD (see FIG. 13) are replaced by a diode bridge including diodes D1–D4 and transistors Tr1 and Tr4 (see FIG. 13a). One line terminal is connected at a to the common electric circuit of the telephone, while another terminal is not, as usually, connected to b but rather is connected to S, and the wire run usually provided between b and S is removed. The opposed ends of diode bridge D1 to D4, namely, the terminals between D1–D2 and D3–D4 are connected to terminals b1 and 1, respectively, of the electric circuit of the apparatus by means of connecting wires with lugs $36_1$ and $36_2$ while lug $36_3$ is connected to both the collector of a transistor Tr1 and transistor Tr4 and is fastened to connecting terminals 3 of the electric circuit. And finally, the anode of Zener-diode D7 together with the collector of transistor Tr4 has its lug $36_4$ fastened to connecting terminal 4.

In FIGS. 13 and 13a, it is possible to see that the phonic section 17 of the telephone is unchanged with respect to its position.

Figure 9:
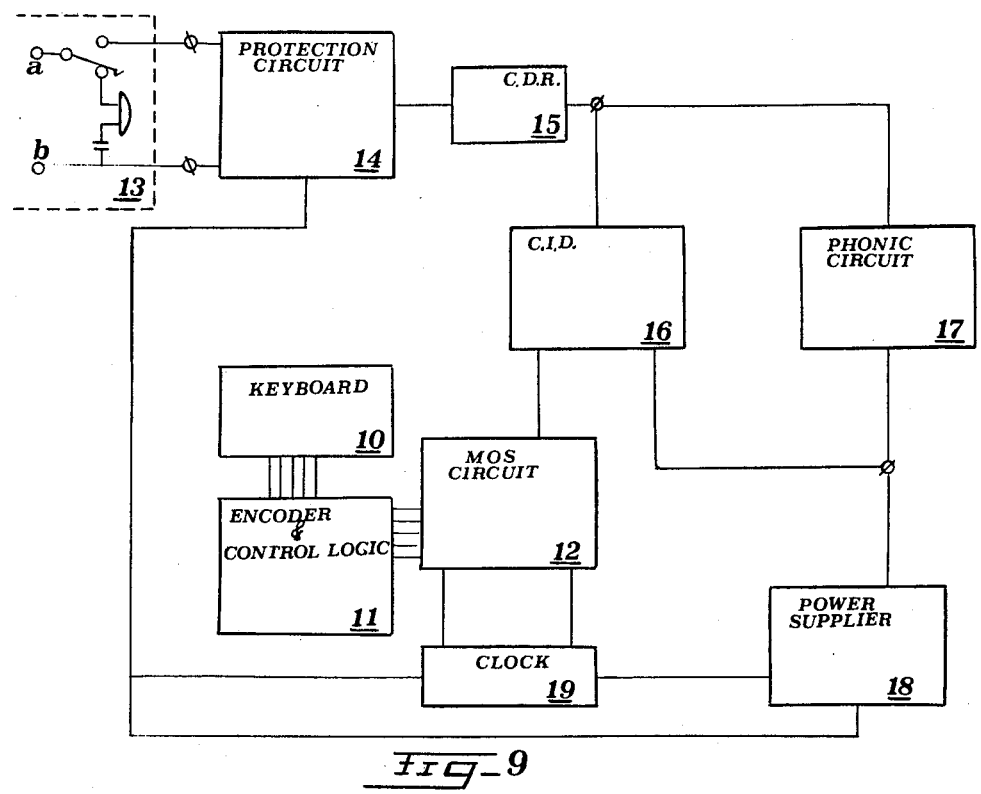
FIG. 9 is an electronic block diagram which shows the several sections of the general electronic circuit system which particularly relates to the first embodiment of the invention.
Figure 10:
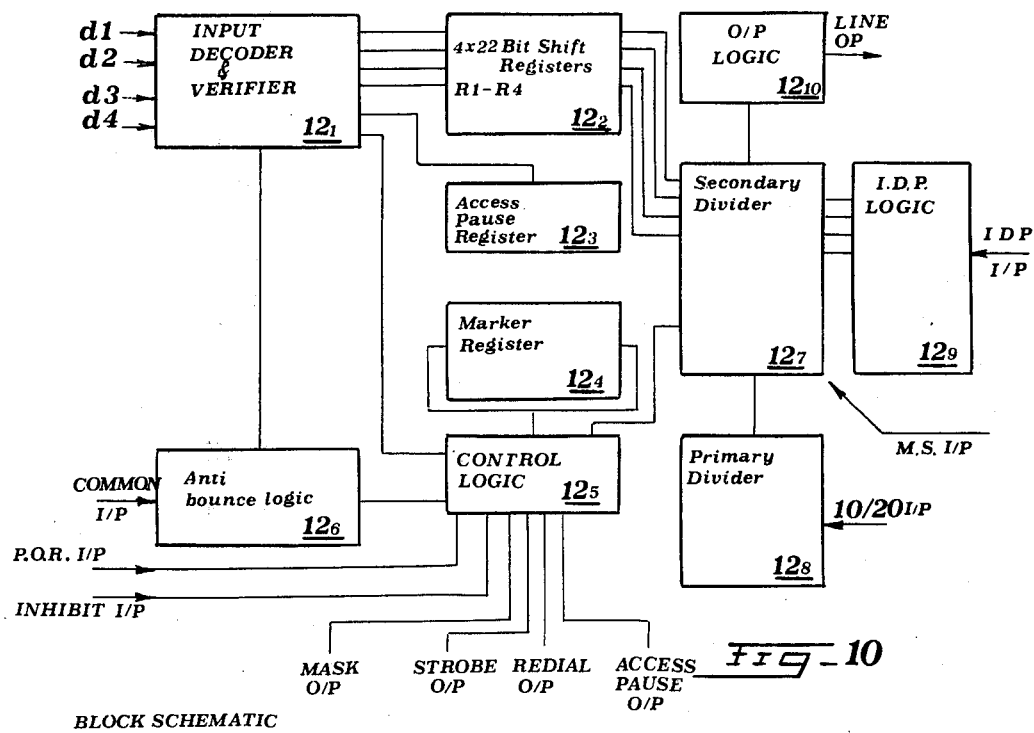
FIG. 10 is an electronic block diagram which shows in greater detail the circuit of FIG. 9.
Figure 11:
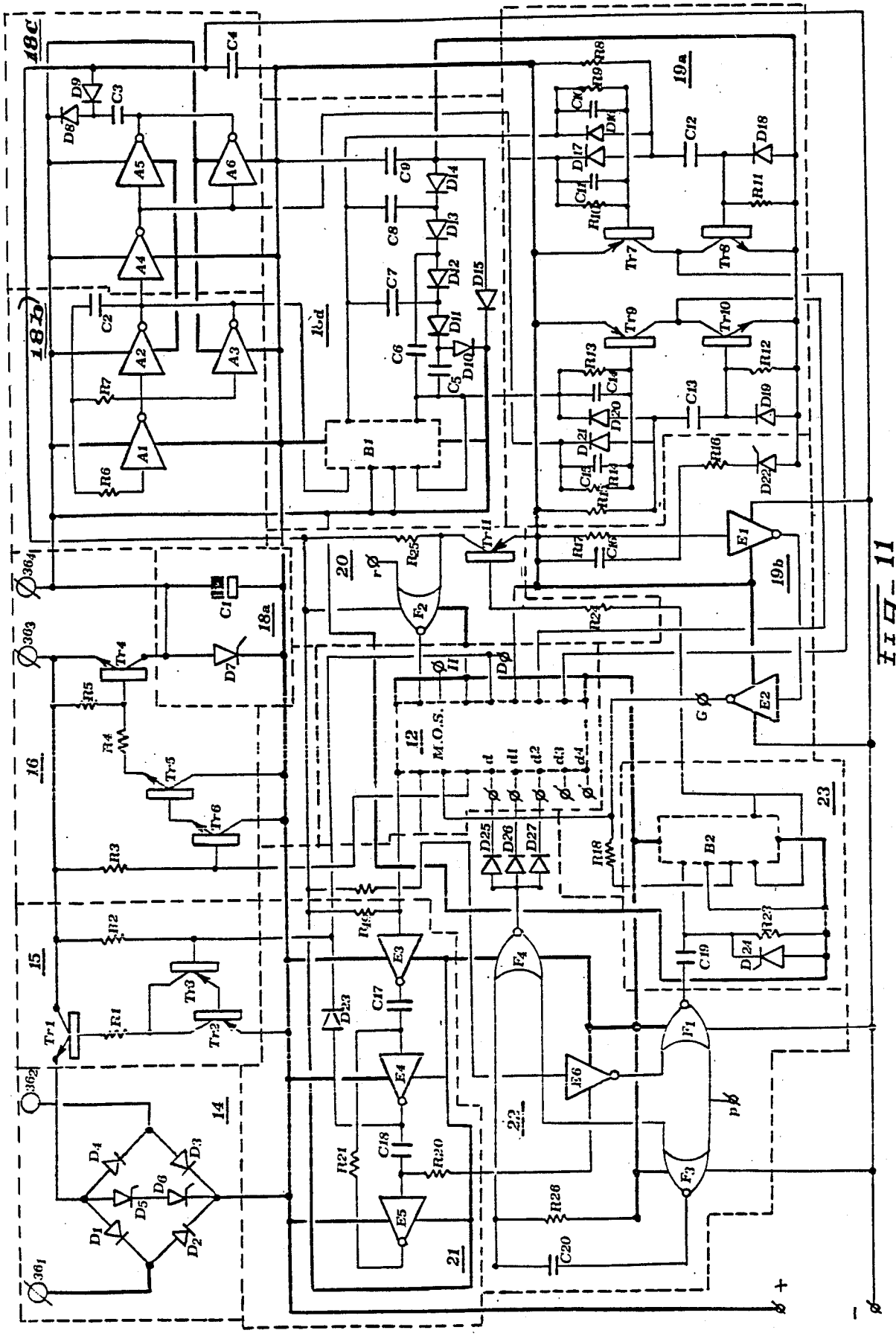
FIG. 11 is a detailed schematic diagram of the electronic system of the first embodiment of the electronic dial.

A block diagram of the electronic circuit system of this novel telephone dial 10 is illustrated in FIGS. 9 and 10, and the circuit sections thereof are detailed in the general electronic diagram of FIG. 11. As it will be explained hereafter, in FIG. 11 it is possible to find those sections of the circuit which permit electric connection between dial 10 and terminal board 37, by means of four wires 35 and lugs $36_1$ to $36_4$ thereof.

As was said above in describing the component members of this new telephone dial 10 with reference to FIGS. 4 and 5, the first board 18 relates to a printed circuit of the keyboard 20 and is provided with connectors (not shown) going out of said opening 23 for being connected to the circuits of the general electronic system of FIG. 11 which is provided on the second board 27.

It is advisable to refer first of all to the keyboard circuit which comprises a section 10 and a section 11, as shown in FIG. 12. Section 10 relates to the switches of the circuit which are initially in the OFF state as in FIG. 12 and may be turned ON by the user in a desired sequence by dialing a telephone number to be called. Through the sequential depression of keys 17 in accordance with the sequence of the component digits of said number, the related switches will be turned ON.

Section 11 comprises twenty-five silicon switch diodes, indicated by reference numerals D28 to D52, as well as seven resistors R27 to R33 which are connected in order to form connecting terminals d–d1–d2–d3–d4 for section 12 of the general electronic system (see FIGS. 9-10-11) and r-p which are also evidenced in sections 20 and 22, respectively, of that system (see FIG. 11).

The selected code is similar to the standard for a keyboard system "M.F.Tone", so that a keyboard of this latter type may be connected in parallel, if desired.

Through a careful examination of the general electronic diagram of FIG. 11 it should be possible to those skilled in the art to value the function of single components as far as the operation of the decade digital dial is concerned, in accordance with the illustrative example of a first embodiment of the invention.

Starting from connecting terminals $36_1$ and $36_2$ connected to b1 and 1, respectively, of terminal board 37 (see FIGS. 8 and 13a) a section 14 comprises the diode bridge D1 to D4 which permits the operation of this electronic device when the two line cables are inverted, as may occur in some telephone exchange at the moment of reply. To the diode bridge are also connected two Zener-diodes in order to hold nearly constant the load voltage and protect against overvoltages which may be induced in the line from the telephone exchange.

As aforementioned, the common switches CRD and CLD of a conventional telephonic circuit are replaced in the preferred embodiment, by high voltage switch-transistors Tr1 and Tr4. These transistors are of large size in respect to the dissipated power, so that the reliability of the system as a whole is improved. For making more reliable and faster the action of the switch-transistors, a Darlington connection is preferred. More particularly, transistor Tr1 which has the function of opening and closing the line is controlled through a pair of transistors Tr3 and Tr2 in a Darlington connection.

It is obvious that for carrying out some particular application, the above purpose may be reached in other manner.

Without a control signal, all of the three transistors are in their conductive state, and the voltage drop at the output of transistor Tr1 is about 0.01 V, with a current of 200 mA.

Switch-transistor Tr4 shorts phonic section 17 of the telephone (see FIGS. 13-13a) on emission of pulses, and the related control is provided through the pair of transistors Tr5 and Tr6 in a Darlington connection (see section 16 in FIG. 11).

When no control signal exists all these transistors are in their inhibition state and phonic signals may then energize the related transductors. On the contrary, when a control signal is received, the transistors turn to their conductive state, so that the phonic section 17 is shorted provided. The user will be acquainted with the emission of ON and OFF line pulses, because through the earpiece he may listen in a light signal relating to same.

It will be understood that to operate the device without using any external power supply to thereby obviate interface problems, power is partially drawn from the telephone exchange and this function is carried out by means of Zener-diode D7 and a parallel capacitor C1, which are included in section 18a of the electronic system (see FIG. 11).

During the OFF periods of the line when a telephone number is dialed, capacitor C1 partially transfers its charge to the power supply circuit so that this circuit continues its operation. Capacitor C1 is then recharged during those time intervals when the line is ON.

Referring now to the supply circuit, it comprises essentially three stages because three different voltage values are necessary.

The first stage comprises a dc/ac converter formed by three inverter-amplifiers A1-A2-A3 (see section 18b) of which A1 and A2 are parallel connected to supply an a.c. signal of appropriate power. The system oscillates at 36 kHz to generate a square-wave signal of about 3.3 V. The oscillation frequency is defined by the time constant of the composite network C2-R7, while resistor R6 holds the period of oscillation at a constant value when some variations occur in the power supply voltage, temperature and the semiconductors.

An inverter-amplifier, having a buffer function, is indicated at A4 (see section 18c) and inverts the signal input thereto with the output coupled to amplifiers A5 and A6, the outputs of which are coupled to diodes D8 and D9 through capacitor C3. This capacitor, in turn, increases and rectifies the alternating voltage which is then filtered by means of capacitor C4.

Across the capacitor C4, a voltage is provided which is twice the voltage across Zener-diode D7.

The six amplifiers of sections 18b and 18c of the general electronic system of FIG. 11 are included in a single integrated circuit.

Proceeding to the second stage of the amplifier, in section 18d a bistable multivibrator B1 is provided, i.e., a type D flip-flop which is connected in such a manner that it operates as a divide-by-two unit. Thus, the square-wave signal coming from the oscillator has its frequency reduced to 18 kHz and is coupled from the two complementary outputs of a voltage multiplier, which in this embodiment is preferred to be the Cockroft-Alton type. This multiplier comprises diodes D11 to D14 and capacitors C5 to C8 so that it is possible to raise the voltage to five times the initial value. The voltage is then filtered through capacitor C9, while another diode D15 prevents the rectified and increased voltage from being shifted from the referred point.

Figure 14:
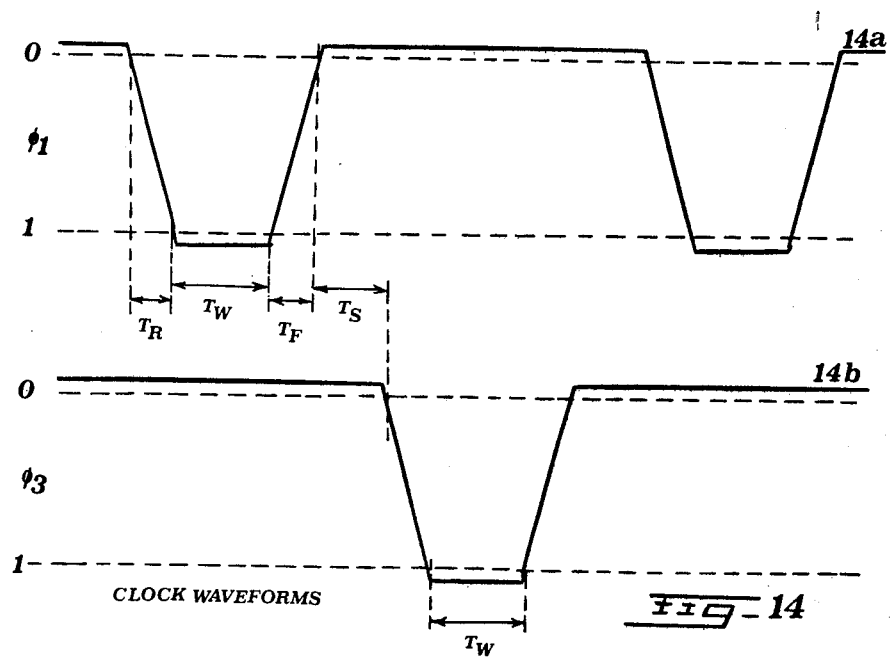
FIGS. 14 to 17 relate to the waveforms provided for the electronic keyboard dial according to FIGS. 1-2 and 4-5.

To provide the formation of pulses at the suitable time intervals an integrated MOS circuit with eighteen pins has been preferred, because of the particularly useful features of the metal-oxide semiconductor circuits, namely, dynamic memory, high input impedance, large noise margin and a lower power dissipation. Therefore, a third stage is provided for the power supply circuit in order to generate a signal having two not superimposed phases. This third stage comprises transistors Tr7 to Tr10, diodes, D16 to D21, capacitors C10 to C15 and resistors R8 to R15, as shown in FIG. 11 at the Section 19a of the general electronic system. For a correct operation of said third stage, the signals have been drawn from bistable multi-vibrator B1 and inverter-amplifier A4. Related wave-forms are shown in FIG. 14.

In order to prevent the generator system from operating when the optimal level of voltages and pulses has not yet been reached and thus to avoid the possibility of improper operation, delayed actuation of the system is provided by inserting a suitable circuit (see Section 19b) which comprises Zener-diode D22, resistors R16 and R17, capacitor C16 and two inverter-amplifiers E1 and E2. That delay is due to the time constant of the network comprising parallel resistor R16 and resistor R17, resistor R17 being connected to capacitor C16.

Figure 15:
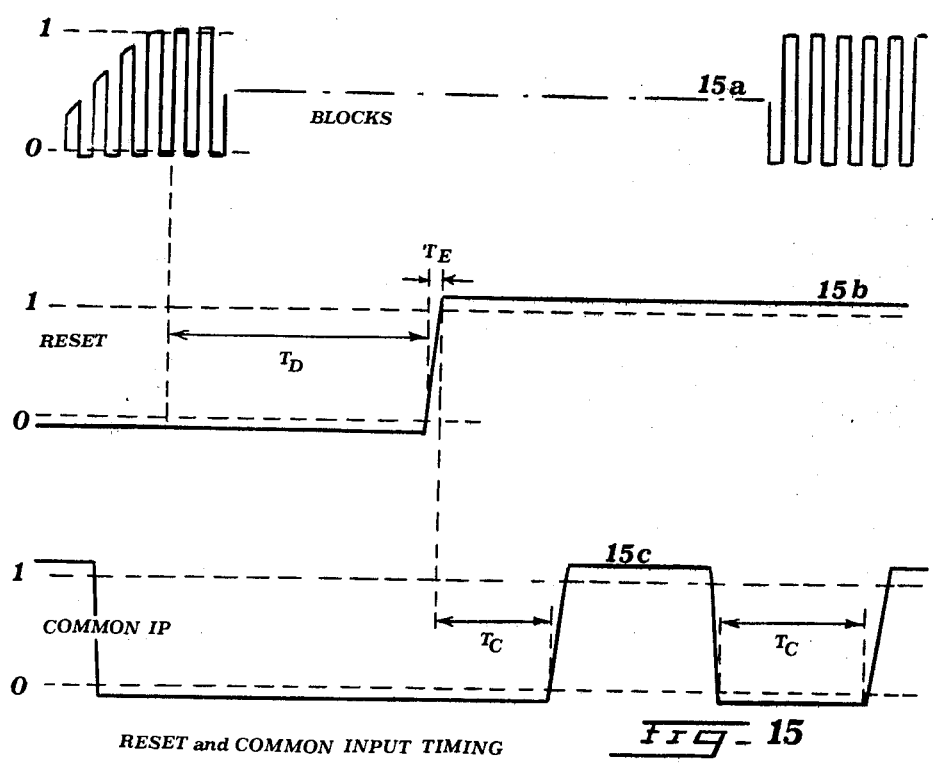

Related waveforms are shown in FIG. 15.

It should be pointed out that the electronic system has been so designed that the supply circuit and the entire electronic system have a total power dissipation of about 3.63 mW, namely 1.1 mA at a voltage of 3.3 V.

Referring now to the operation of the pulse generator which is carried out by means of the integrated MOS circuit manufactured according to an MTNS process, a four stage dynamic logic is used to reduce the power consumption to the lowest level.

Figure 16:
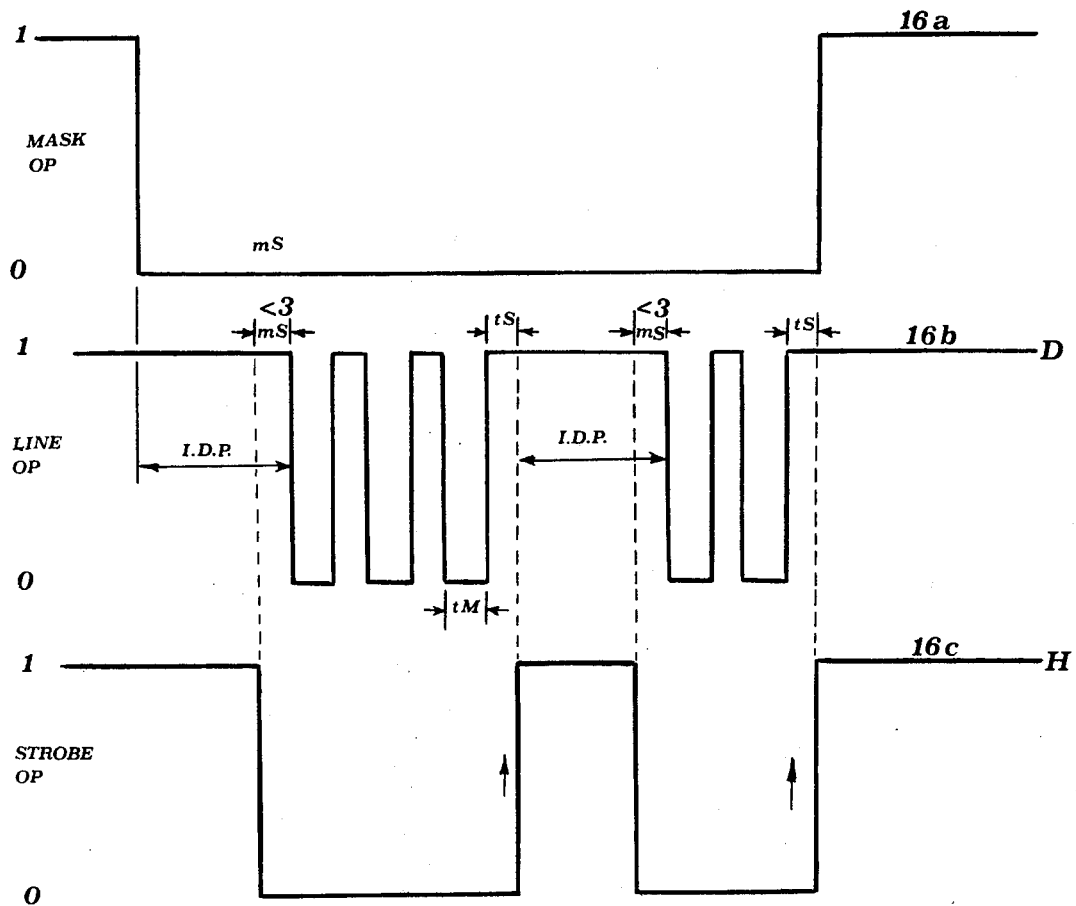
Figure 17:
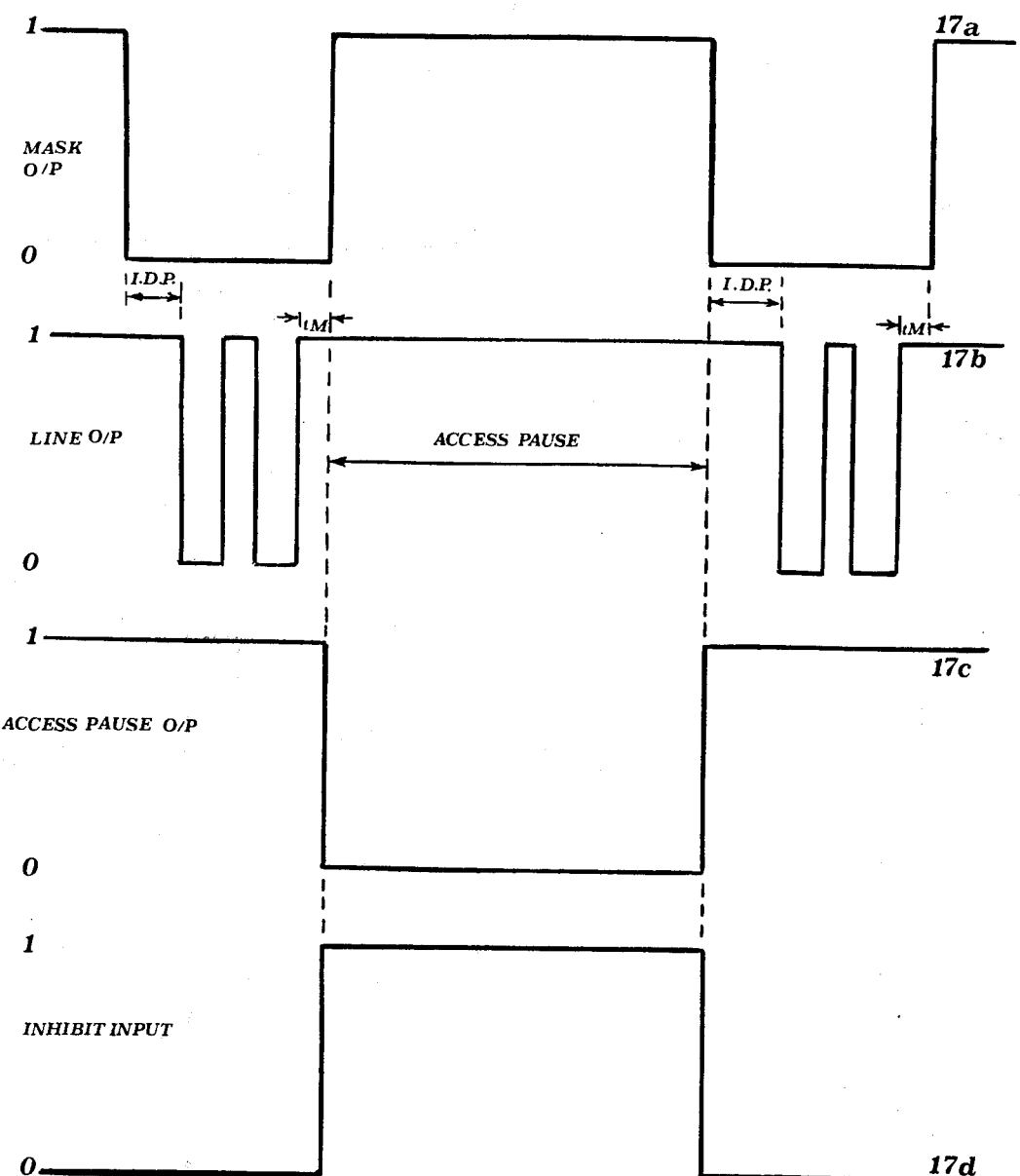

The block diagram of FIG. 10 illustrates the formation and operation of the several circuit subsections of integrated MOS circuit 12, the most important features of which may be summarized as follows:

(a) the possibility of selecting two time period values for sending the component digits of a telephone number, namely 100 msec and 50 msec as corresponding to the emission of 10 and 20 pulses/sec, respectively;

(b) the possibility of selecting the ratio between ON/OFF states of the lines in four values, namely 70:30—66.66:33.33—60:40—50:50;

(c) the possibility of selecting the pause time between emission of pulses related to a digit and those of the next one, a selection in two groups each one of three values being provided on the basis of the selected pulse emission speed, namely:
for 10 pulses/sec—400 msec or 800 msec or 1000 msec
for 20 pulses/sec—200 msec or 400 msec or 500 msec
Related diagrams are shown in FIG. 16 wherein:
tS is on the ON time interval of the line
tM is the OFF time interval of the line;

(d) further to the elastic switches being provided as anti-bounce means acted by depressing keys 17, as aforementioned, some other anti-bounce devices are also provided at all control inputs;

(e) this novel electronic telephonic dial may emit and store up to twenty digits after which the inputs are deactivated and further depression of keys 17 of dial 10 produce no results;

(f) between one digit and the next one up to twenty pauses may be programmed, that is, a pause number similar to the digits to be dialed;

(g) during a pause which begins when the precedent digit has been completed, the circuit stops the emission of pulses relating to succeeding digits and contemporaneously the short of phonic section 17 is open so that the signals may be listened in. When key P (FIGS. 1-2) is depressed, which controls the prosecution of the pulse emission, the standard time inerval begins between a digit and the next one after which the operation of sending pulses on the line is continued. This function is evidently very important as it avoids any useless action of the selecting relays at the telephone exchange, when at the beginning of a number dialing the line appears to be engaged. This may particularly occur by direct dialing, when such an arrangement results when first digits relating to the district line are dialed;

(h) the novel dial sends on the line the pulses when generated by depressing keys 17 of keyboard 20, when number dialing occurs at a much higher speed. This is possible since the dial itself provides the time intervals at the moment when the pulses are sent on the line. Furthermore it stores the pulses so that they may be sent on the line at a subsequent time.

Two important possibilities are then provided:

(1) to store a number already dialed, by depressing key R when such number appears to be engaged, so that the telephone line may contemporaneously be disengaged. When by hearing through the handset that the line appears to be free, it is not necessary to dial again the number to be called, but only to depress the key R for resending on the line the pulses thereof;

(2) to store a number which has been received from the other subscriber during a telephone conversation and which is to be dialed at the end of same. This is possible without noting such a number when received by depressing key P and dialing it; then before putting down the handset on the rest cradle depressing again key P to send automatically on the line the pulses of the number to be called, that is to say, without dialing it through the keyboard.

Referring now to the general electronic system of FIG. 11, it is important to describe in a sufficiently detailed from the logic circuits which transmit and receive the operative controls and analyge the integrated MOS circuit of section 12.

As said above in connection with section 12 an MOS circuit with eighteen pins is provided, the pins being hereafter indicated by consecutive numerals from 1 to 18, beginning from the first at the top of the left column and ending at the last at the top of the right column.

At pin 1 the operative signal for disengagement of the line is present when an order is given to store a number already dialed or to dial a number by depressing keys 17 of keyboard 20 (see FIGS. 1 and 2), i.e., when the users hold up the handset from the rest cradle of the telephone, so that the switches are controlled. This operation takes place through amplifier E3 which controls the timer comprising inverter-amplifiers E4–E5 and the resistor-condenser networks indicated at R21-C17 and R20-C18 (see section 28) which establish the time constants which provide for maintaining the pulse time (425 msec) so that the line may be disengaged. Because of the particular configuration of this timer a constant time interval may be obtained with a tolerance of $\pm 5\%$ in respect to the predetermined time interval, holding in due consideration the variations of voltage and temperature as well as the unavoidable differences of the components being used. The signal control for line disengagement is applied through diode D23 to transistor Tr3 which, in turn, controls transistor Tr2 which disables transistor Tr1 (see section 15). Resistor 19 serves to hold, in the waiting condition, the pulse generator system for disengagement of the line until a new control signal is generated by the MOS circuit.

At pin 2 a waiting operative signal for an access pause is present, the signal being generated by the MOS circuit when the digit preceding the pause to be performed is sent on the line. This function is carried out by means of inverter-amplifier E6 (which is included in a single integrated CMOS circuit together with amplifiers E1 to E5) for controlling one input of a two input NOR gate F1 (see section 22). Through capacitor C19 the pulse generated by F1 is transferred to the input of a flip-flop B2 (which is included in a single integrated CMOS circuit together with said flip-flop B1) after its adjustment to a suitable level through resistor R23 and Zenerdiode D24 (see section 23). The signal being present at the complementary output of bistable multi-vibrator B2 through resistor R24 drives transistor Tr11 into the state which, in turn, controls one of the inputs of NOR gate F2 because of the voltage drop across resistor R25, the output of the NOR gate F2 being connected to the enabling input of the MOS circuit with a consequent inhibiting thereof of pulses relating to the remaining component digits of the called number.

Pin 3 of MOS circuit corresponds to the zero setting of the same. This action is performed through the delay circuit (see section 19b), so that everytime the handset is lifted from its cradle is held up, zero setting of the device is provided.

Pin 4 provides to the output of the signal for shorting the phonic section 17. The MOS circuit generates that signal when pulses relating the other component digits of the number are emitted and drives transistors Tr6 into its conduction state. Transistor Tr5 is, in turn, carried to its conduction state and transistor Tr4 is also carried to the conduction state (see section 16). Resistors R3 and R5 hold the transistors in a non-conductive state when no control signal is present. When at pin 2 of the MOS circuit, a pause signal is present, then the control signal disappears at pin 4 and appears again when control of signal generator is given by depressing the related key, namely key P of keyboard 20. The related waveforms are illustrated in FIGS. 14 to 17.

Pin 5 corresponds to the common input already indicated by reference character d (see sections 10 and 12), to control the signals coming from keyboard 20 and logic control $12_5$ (see FIG. 10).

Pins 6-7-8-9 correspond to d1-d2-d3-d4, respectively (see sections 10 and 12) as inputs for the control signals, coming from keyboard 20 and the combination of which defines the function that MOS circuit has to carry out.

Pin 10 relates to the grounded connection of the MOS circuit and all the other negative voltages are referred to it.

To pin 11 is coupled one of the phases of the signal having a frequency of 18 kHz which is generated by the third stage of the power supply, namely, that which is drawn from the collectors of transistors Tr7 nand Tr8 (see section 19a).

To pin 12 is coupled the other phase of said signal, namely, that which is drawn from collectors of transistors Tr9 and Tr10 (see section 19a).

Pin 13 relates to the selection input for pulse emission speed which in this illustrating example of embodiment was assumed to be 10 pulses/sec.

At pin 14 is present an operative control signal to open and close the line through transistors Tr1, Tr3 (see section 15). The related waveform is illustrated in FIG. 16. This signal is also used in a second embodiment of the invention, as explained hereafter.

Pin 15 relates to the selection input of the time interval ratio of opening and closing the line, i.e., between tM and tS as said above referring to FIG. 16.

Pin 16 is generally provided for the operative signal to control each emitted digit. In this embodiment that pin is not used but is found in a second embodiment wherein a visible display device is also provided in accordance with the novel electronic dial.

Pin 17 refers to the control input to inhibit the emission of pulses. This control comes on through NOR gate F2. Besides controlling the inhibition, that input when acted simultaneously with the common input through diode 28 (pin 5, having also the reference character d in sections 10 and 11) when key R is depressed, performs the storage of one or more numbers being dialed through keyboard 20, as well as all other information already received. Assume, for example, that one of these numbers has been dialled by the user because of an indication he had by the called subscriber during a conversation with him and storage of that number is desired for a next call without transcription thereof. In this case, as said above, it is sufficient to depress key P of keyboard 20 at the moment of hearing such a number and dial same. At the end of the telephone conversation and without putting down the handset on the rest, the user will depress key P again for having on the line the number to be called. It is thus easy to understand that key P carries out a double function, because of its special connections.

Finally, pin 18 relates to the selection input of the time interval between one digit and the next one, in this illustrating example that time interval is 800 msec.

As shown in the general electronic diagram of FIG. 11, the section which is therein indicated by reference numeral 22 comprises NOR gate F1 (the function of which together with that of NOR gate F2 has been mentioned above) and the NOR gates indicated by characters F3 and F4. When NOR gate F3 is not inhibited by a control coming from the MOS circuit, it may be controlled through keyboard 20 if key P is depressed. The signal being generated by F3 through capacitor C20 and resistor R26 is coupled to F4 to generate a pulse which, through diodes D25, D26 and D27 reaches inputs relating to the programmation of pauses. On the contrary, when NOR gate F3 is already inhibited by the signal which is coming from pin 2 of the MOS circuit, then by depressing key P, NOR gate F1 is enabled, as illustrated in section 22 of the general electronic system of FIG. 11, and NOR gate F1 enables, in turn, flip-flop B2. Through this flip-flop transistor Tr11 and NOR gate F2 are then enabled to pass the signal to pin 17 of MOS circuit so that this latter is enabled to generate the rest of the pulses again.

Referring now to the second embodiment of the present invention wherein the novel decade digital telephone dial is also provided with a visible display device, a diagrammatic illustration thereof is shown in FIGS. 3 and 7, while its component members are shown in exploded view in FIG. 6. Through these FIGS. 3, 6, and 7, it may be seen that a keyboard telephine dial 110 with display is provided which is substituted for a conventional telephone dial in accordance with one of the most important features of the present invention, the appearance and component members of which are similar to dial 10 of the first embodiment just described and illustrated in FIGS. 1-2 and 4-17.

When FIGS. 4 and 6 are compared it is possible to note that the novel dial with visible display device; (1) is provided with an elongated opening 116' in its cover 113 to display the telephone number being dialed; (2) is provided with a third board 31 which is fastened to that part of the dial which is similar to FIG. 4, for example, by means of screws 130 having an axial threaded hole so that the board 31 may be tightened by screws 30; and (3) the board 31 is provided with an electronic circuit relating to the display device.

Thus, while the first board 18 and second board 27 relate to the systems above described and illustrated in the first embodiment, the board 31 has been provided for the electronic circuits of the display and its electrical connections with boards 18 and 27 illustrated in a general electronic block system shown in FIG. 18.

Likewise the descriptive form followed for the first embodiment, will be pointed out which are to be added to the first embodiment in order to evidence the further advantages of the present invention. In fact, the display aims at obviating the faults of prior art in this field.

As is well known, in accordance with the prior art a telephone number being dialed by the user may be verified only when the phonic answer of the called subscriber is received. Thus, in the case of a wrong dialing either through inattention or faulty operation of the apparatus, or further non-selection by the telphone exchange, the subscriber suffers a money loss due to the counter call such loss being greater the longer the distance to the called subscriber by a direct dialing. To this money loss the time loss of the subscriber is added since he must repeat the number dialing. In addition, the party erroneously called has its telephone line uselessly and involuntarily engaged.

When an electronic telephone dial with display is used in accordance with the present invention, to the advantages being already evidenced hereabove as described in the first embodiment, the following other advantages are to be added:

(a) the possibility of controlling the visible display device by means of call pulses, that is to say, displaying of the component digits and characters of a phone number when it is dialed, substantially contemporaneously and in the same sequence of such a dialing, so that through the visible display any error may immediately be pointed out from the first digit being dialed;

(b) the possibility of cancelling a number when partially dialed, i.e., before the telephone exchange counter is operated and without awaiting that the called subscriber confirm the exactitude of the dialed number, with an obvious saving of time and money;

(c) the certainty that the displayed number is actually the called number, when a different answer is voluntarily given by the called subscriber; and (d) direct power supply through the telephone line and then total autonomy, so that the sending on the line of some non-exact number is avoided, as may on the contrary be possible when power is supplied through an electric network and current is turned OFF on the line.

Referring now to the general electronic diagram of a dial with display in accordance with the present invention (see FIGS. 3-6-7) the block diagram of FIG. 18 and more detailed circuits of FIGS. 19 to 22, comprise the most important circuits of the first and second embodiment, with its innovatory features and advantages resulting therefrom.

Figure 20:
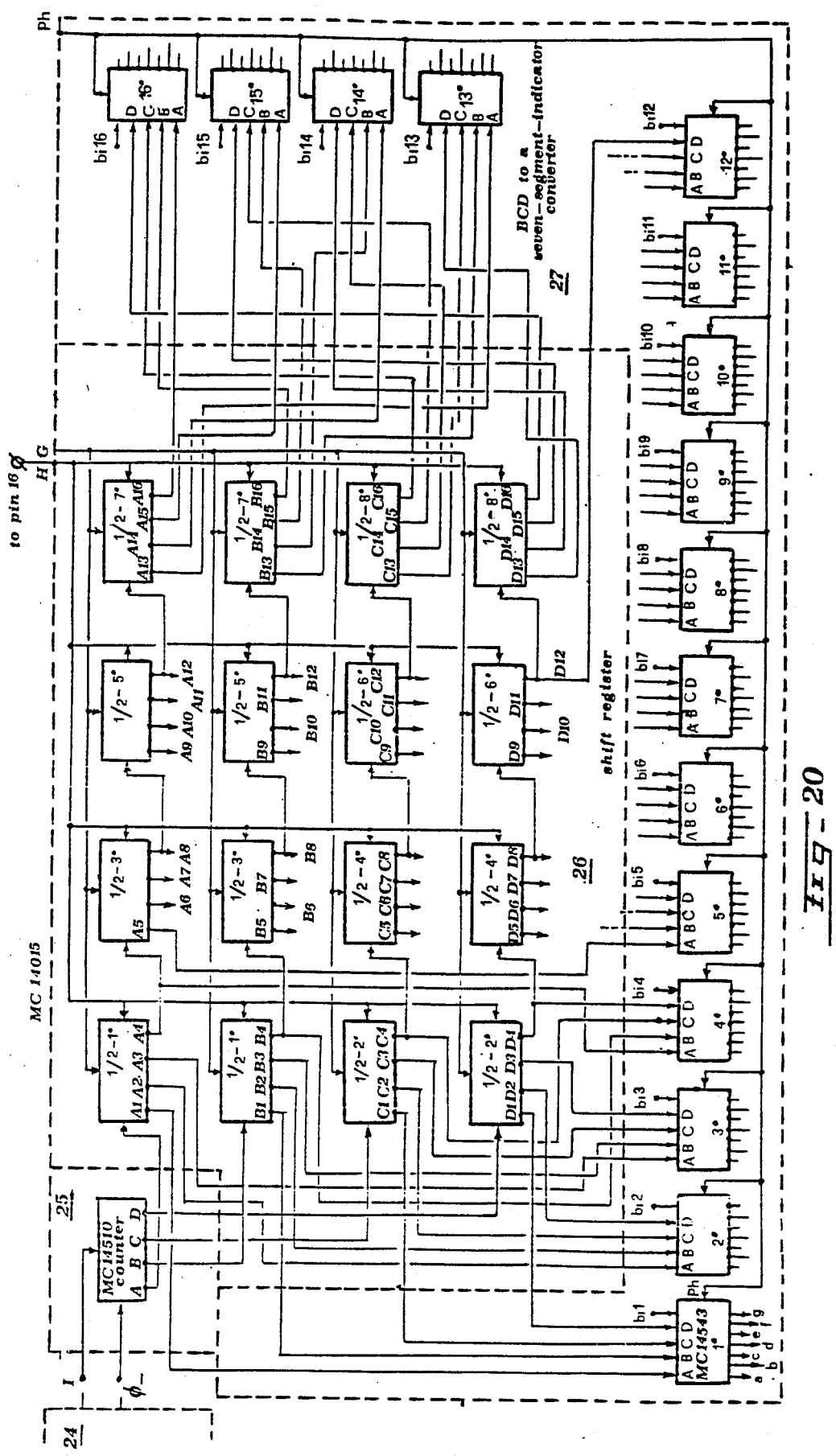

In substance, the block diagram of FIG. 18 and the detailed diagrams of FIGS. 19 to 22, particularly referring to the display, comprise:

circuit 14 which is a protecting circuit against overvoltages and line inversions;

circuits 18a to 18d where are power supply circuits which draw power from the telephone line and convey same to the remaining circuit system even when the line current is turned OFF;

integrated circuit 12 which is a generator and detector of pulses sent on the line, and which supplies a signal at a suitable level for the operation of logic circuits 24, 26, 29 pertaining to the display;

device 19b which zero sets all registers when the handset is held up and power is supplied to to the electronic system;

pin 16 of MOS circuit 12 which, as mentioned above, in this second embodiment provides for the detection of the completion of each single digit and then supplies the pulse for transferring the detected or read digit; and circuit 24 (see FIG. 19) which in this case is a circuit to be inserted between the circuits already described and circuit 25 of the counter, so that a pulse is provided for zero setting counter 25 after the contents of same has been read and transferred to memory registers 26 (see FIG. 20).

Figure 27:
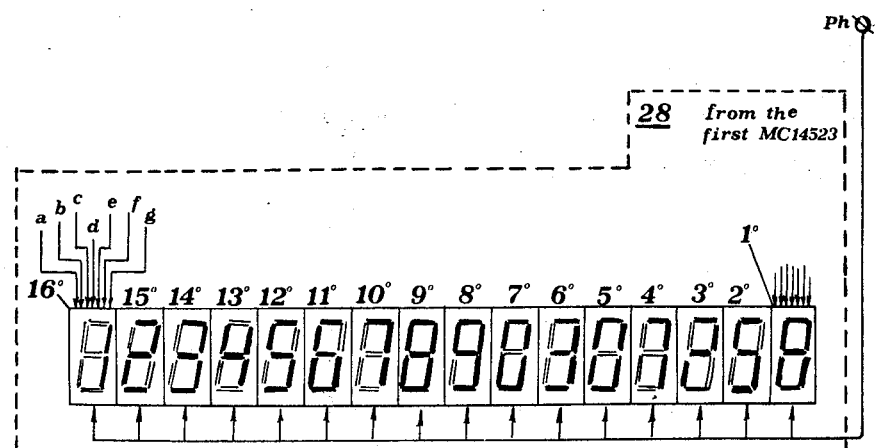
FIG. 27 is a detailed illustration of the selected number wherein the component digits are shown in a seven-segment-indicator code.

For those sections of the general electronic system the function of which is to display the digits of a number to be dialed, it is further pointed out that:

(a) section 24 i.e., the circuit inserted before circuit 25, in addition to connection terminals + and − has terminals G and H which are also shown in section 19b and the pin 14 output of MOS circuit 12. Output I is connected to Section 25 (see FIG. 20) together with the—output I is specifically coupled to the zero setting counter 25, while H is coupled to the clock pulse and G to the zero setting of the system, i.e., when the handset is held up, a pulse is provided at G and the system is zero set;

(b) section 25 in the circuit system of FIG. 20 is specifically indicated for the counter which counts in BCD code and pulses being sent on the line;

(c) section 26 relates to the memory and shift registers which store the data being supplied by counter 25 and read out same so that it may be sent to related decodifiers 27 in its proper sequence, the section 26 being connected at H to pin 16 of MOS circuit 12 and at G to pin 3 thereof;

(d) section 27 relates to the decodifiers which convert the signal stored in registers 26 from the BCD code to a code suitable for controlling display circuit 28 (see FIG. 27). In this embodiment a liquid crystal seven-segment-indicator code is preferred and circuit 28 has sixteen indicators. The first two digits and the total digits of a number being dialed are shown in FIGS. 25 and 26, respectively;

(e) section 29 (see FIG. 22) is a shift register which enables the formation and display of the digits in visible display device 28 as they are transferred to the memory register 26; in section 29 is indicated at C the negative reference point; and (f) section 30 is the square-wave signal generator, having an output frequency which is necessary for the operation of display device 28.

Substantially, display device 28 may be considered either directly incorporated in electronic dial 110, i.e., within the telephone apparatus, or as a device which may be placed independent of the telephone apparatus, however, electrically connected thereto at the terminal board of same for carrying out its function.

Before detailing the operation of the display in accordance with the present invention, which is similar in both these applications, some consideration has to be made in relation to the block diagram of FIG. 28 concerning an example of the independent application of a display device, which may be assumed is enclosed within a case having an opening to display the number being dialed similar to opening 116' of dial 110 (see FIG. 3).

When the block diagrams of FIGS. 18 and 28 are compared, it is first of all possible to note that a similar structure is provided for in those sections which particularly relate to the display device, namely, blocks 25 to 30, so that what has been described and illustrated in this connection with reference to the second embodiment of the invention (see FIGS. 18 to 22) is also valid for the display device being diagrammatically shown in FIG. 28.

Sections 31 to 36 of FIG. 28 substantially carry out the functions of sections 14 to 23 already described and illustrated. Some variation is preferred as illustrated in the detailed circuits of FIG. 29 and FIG. 30 and in connection to a terminal board of conventional telephone apparatus, as shown in FIG. 32.

Figure 32:
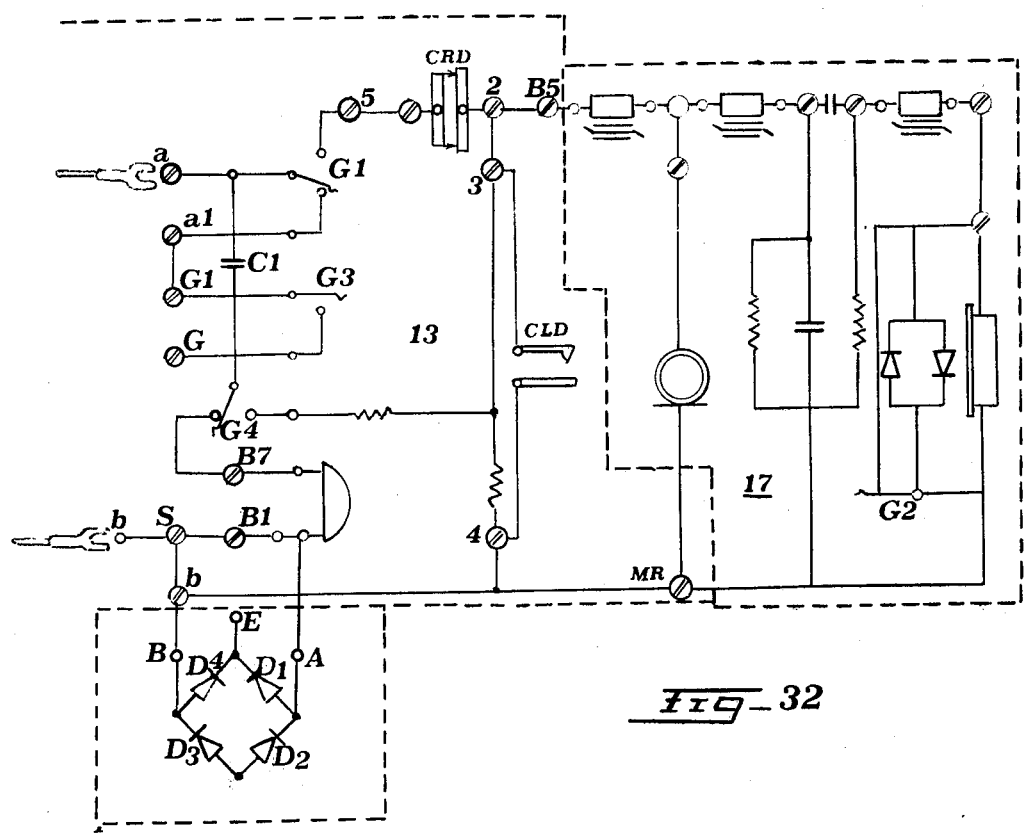
FIG. 32 is a detailed schematic illustration of the electric connections of section 31 to the display device in a conventional telephone.

As may be seen in FIG. 32, after line wires a and b there is a switch G1 the position of which corresponds to the handset put down on the rest cradle of the apparatus. In this condition the telephone line is closed through capacitor C1 and switch G4 on clock S, so that no current passes across the remaining part of the circuit.

Also in this case, similar to FIG. 13a, line cable b is directly connected to connection terminal s, and the connection wire run which is usually used between connection terminals b and s has been eliminated.

Protecting circuit 31-18a (see FIG. 29) of the display device, comprising diode bridge D1 to D4, Zener-diode D5 and flywheel capacitor C1, is connected at B to connection terminal b and at A to connection terminal B1. In short, for this application two wires only of circuit 31 are connected to the terminal board of a conventional telephone apparatus.

When the micro-telephone is held up, switch G1 connects line cable α to 5 and through switch CRD of the dial (which is usually closed in the rest condition) to phonic section 17.

Through the protecting device which is connected to terminals b and B1, the circuit is ON at line wire b so that current is flowing across two diodes of the bridge ($D_1$–$D_2$ or $D_3$–$D_4$ respectively) and the Zener-diode, the current direction being dependent of the polarity of line cable a and b. That is to say, in this application current flow always has the same sign when the line cables are inverted, which may occur in some telephone exchange. Furthermore, when because of induced voltages on the line a higher voltage than the Zener-diode breakdown voltage is reached, then the Zener-diode shorts the excess voltage so that the voltage supplied to the remaining circuitry is never higher than the Zener breakdown voltage.

Capacitor C1 is charged to the Zener-diode voltage and supplies current in those time intervals when line a and b is OFF through switch CRD so that no current flows across the protecting circuit.

When the handset is held up and current flows across Zener-diode D5 (see section 18a), then the oscillator (see section 32) which comprises two inverter-amplifiers (1/6 MC 14069) begins to oscillate at a frequency f1 defined by the time constant T=R2C2 and the square-wave signal of the oscillator controls a bistable multi-vibrator of the D type (½ MC 14013).

The voltage at outputs Q and $\overline{Q}$ of the multi-vibrator is amplified from 3.3 V (at the terminals of Zener-diode) up to about five times the initial value, which is necessary to operate the remaining circuit, through a Crockroft-Walton voltage multiplier comprising diodes D6 to D10 and capacitors C3 to C7.

A voltage is also supplied during those time intervals when the line is OFF, whic is due to switch CRD, and it is necessary to dial a telephone number, as capacitor C1 may supply a part of the power being stored therein.

The circuit which is detecting the opening of the line is indicated with reference numeral 33 in FIGS. 28 and 29 and comprises a pair of complementary silicon transistors Tr2 and Tr3, and base of which is connected to terminal B of the protecting circuit through networks R6-D11 and R9-D12. Thus in this application one of the two transistors is in its conduction state, independently of the polarity of the voltage at terminal B in respect to common line E.

In fact, when B is negative in respect to E, transistor Tr3 will turn to its conduction state, while Tr2 is inhibited; on the contrary, when B is positive in respect to E, transistor Tr2 will turn to its conduction state while Tr3 is inhibited.

When the line is OFF through switch CRD, while capacitor C1 delivers power being stored therein, no voltage is present at B and transistors Tr2 and Tr3 are inhibited. As the signal at the terminals of resistor R7 swings from 0 to 3.3 V, it is not sufficient to control the logic circuits of the device, therefore transistor Tr1 is used to change the level and invert the signal at terminal D, as shown by waveforom 4 in FIG. 31.

In FIG. 31, waveform 1 relates to the operation of the telephone apparatus when a voltage is present at terminals A-B of the protecting device (see section 31). Waveform 2 relates to the voltage supplied by the power circuit 32. Waveform 3 relates to the general zero setting device which in FIGS. 28 and 30 is indicated by reference numeral 34 and comprises a monostable multi-vibrator (½ MC 14528) controlled at the leading edge of the signal supplied by delay network C8-R10 (see FIG. 29). Therefore, a pulse of duration D1 as defined by the time consultant R11-C9, is provided each time a voltage is delivered by the power supply circuit. This pulse, which is disposable at terminal G (see FIG. 30) serves for zero setting memory registers 26 and enabling abilitation registers 29, and through the three input NOR gate (⅓ MC 14025—see section 36) and decimal counter 25 (MC 14510) which counts the pulses relating to the number of times the line has been OFF through switch CRD and gives the count result at its four outputs, A, B, C, D in the BCD system.

The waveforms relating to the contents of counter outputs are shown at 9, 10, 11 and 12 in FIG. 31.

To inform the circuit that component digits of a number being dialed are completed, a device 35 is provided which comprises two monostable multi-vibrators. These multi-vibrators are formed by means of an MC 14528 and controlled by the pulse supplied by device 33 (see FIGS. 28 and 29), through terminal D. As one of these monostable multi-vibrators acts at the leading edge of the pulse supplied by device 33, and because output signals of the multi-vibrators, together with its controlling signal are sent to a three input NOR gate (⅓ MC 14025), as pointed out by waveforms 4, 5, 6 and 7 in FIG. 31, one pulse only is present at the end of the pulse train relating to the dialed number digit. Said pulse which is disposable at terminal H (see section 35) will transfer the contents being stored in decimal counter 25 to four series of shift and memory registers 26 (see FIGS. 28 and 20).

In this illustrating example of the embodiment four series of four registers in a 4×4 array are provided with serial-inputs and parallel-outputs (½ MC 14015). Therefore, the predetermined contents is held in each register until a clock pulse (being supplied through device 35 at terminal 4) transfers the contents of a preceding register to the next one. As the outputs of said series of registers are connected to the outputs of the counter, each cell thereof stores the counter read information.

Example: Holding up the handset, after the zero setting has cleared the registers the outputs of these registers are at a logic level 0. After a first train of pulses is counted by the counter, device 35 supplies the transfer pulse and the contents of counter 25 is transferred to the first cells of registers 26 which are connected to the counter. In accordance with waveforms of this example, the first digit which has been read and transferred is "1". The contents of the counter (digit 1) is therefore disposable at output A1 of the first series of registers, B1 of the second series of registers, C1 of the third series of registers and D1 of the fourth series of registers.

Transfer occurs at the leading edge of the pulse supplied by device 35. The falling edge of said pulse through the three NOR gates of section 36 (wherein is also coming signal G) drives a monostable multi-vibrator (½ MC 14528) which provides a pulse. The duration of this pulse is controlled by network R14-C12 (waveform 8 in FIG. 31) so that the contents of the counter is zero set and the counter may store a next train of pulses.

When the second train of pulses is completed, which in this example concerns digit "2", after the count is ended device 35 generates a pulse for transferring the counter contents in first cells of registers 26, while the information of said cells is shifted to the second cells, and so on each time the cycle is repeated.

Therefore, at the end of the second train of pulses and after the information shift, cells A1, B1, C1, D1 will contain the information relating to digit 2, cells A2, B2, C2, D2 will contain the information relating to digit 1, while the remaining cells contain the information relating to digit 0, that is to say they are in the condition resulting from the zero setting pulse. At the end of dialing the number to be called, which has here been asumed as 12345678090307258, as shown in FIGS. 25, 26, 28, cells A1, B1, C1, D1, contain digit 8, i.e., the last digit of said number, while digit 1, i.e., the first digit of said number, after shifting through all register cells, is present in cells A16, B16, C16 and D16.

The outputs of registers 26 are connected to decoders 27 (MC 14523) which not only decode the BCD signal but also convert same to be suitable for a seven-segment visible display. The decoders are particularly manufactured to control a liquid crystal display device (of Siemens, Hamlin, RCA type). The outputs of decoders 27 are thus connected to the inputs of visible display device 28.

It is now appropriate to point out another very important feature of the electronic dial with display device according to the present invention. As is well known, those devices, for example calculators, which display sequentially the component digits of a number of calculation purposes, begin to display the digit "0" which remains visible as the only digit with a point when an operation is actually started by depressing the key "0" of keyboard and no more visible but, on the contrary, substituted by another digit being dialed, for example digit "1". In the case of a visible number display in a telephone this could mean that when a number is to be dialed, the first digit of which is "0" as an actual component of the telephone number to be called, as for direct dialing, such a dialing is impossible. The decade digital system of the present invention solves this problem in a satisfactory manner, because a first digit "0" is visible in its display device 28 when its corresponding key 17 is depressed. That is to say, each digit is displayed and sequentially shifted from right to left when a number is dialed up to the last digit thereof.

For this purpose, device 29 embodied with four shift registers 26 (¼ MC 14015) and sixteen inverteramplifiers (1/6 MC 14069) enables through transfer pulse H supplied by device 35 the formation of digits by acting on control "bi" which is present for that purpose in each decoder 27. Thus, each shift pulse will enable the formation of a digit, as may be seen in the table of FIG. 24 and all component digits of a telephone number, that is to say also initial digit "0", are displayed through device 28.

The scope and advantages of the present invention should be understood by the skilled in the art through the above description referred to in the accompanying drawings. It is however to recall here what has been premised, namely, that the invention in its broadest aspects is not limited to the embodiments and/or applications described and illustrated, as they are only some preferred examples of embodiments of the invention. Departures may then be made therefrom within the scope of the following claims without departing from the priniples of the invention and without sacrificing its chief advantages. It is, for example, to note that electronic devices different from the devices mentioned above may also be used, as well as a different circuitry configuration; power supply through the electric network, or rechargeable batteries, or dry piles; light-emitting-diodes (LED) gas discharge tubes, plasma devices and the like as display indicators. Different decoders of a telephone number may also be provided, for example, when the pulses correspond to characters or conventional signs, ON or OFF states of the telephone line may be differently detected, and so on.

What I claim is:

1. A decade digital telephone dial unit for substitution in a telephone having a rotary dialing system, conventional phonic section and handset actuated switch for coupling and decoupling said telephone with the telephone lines of a telephone system wherein said telephone is ready for use by virtue of its coupling to said telephone lines when said handset is removed from said telephone, comprising:

power supply means coupled to said telephone lines and receiving the electrical current conducted therethrough for converting said electrical current to voltages suitable for powering said decade digital telephone dial unit;

a keyboard system positionable in said telephone in place of said rotary dial, said keyboard system including a support base having a plurality of openings therein, a plurality of key switches each being associated with a decimal digit and each movably positioned in an associated one of said openings, and encoding logic circuit means coupled to said key switches and having a plurality of electrical contacts thereon, said contacts being selectively closed by depression of selected ones of said key switches;

pulse generator circuit means coupled to said keyboard system for storing on command from the switching of the key switches of said keyboard system at least one stream of decimal digits corresponding to at least one telephone number, and for transmitting on command from said keyboard system said stored telephone number to said telephone lines in the form of pulses;

clock circuit means coupled to said pulse generator circuit means for generating basic timing pulses for synchronizing and controlling the operations of said pulse generator circuit means;

zero set marker means coupling said clock circuit means to said pulse generator circuit means for generating zero set markers to reset said pulse generator circuit means;

first electronic switching means for opening and closing said telephone lines for the transmission and reception of telephone numbers to and from said telephone lines in accordance with signals derived from said pulse generator circuit means;

second electronic switching means for muting said phonic section by shorting it in accordance with signals derived from said pulse generator circuit means; and protection circuit means coupled between said first and second electronic switching means and said telephone lines for protecting said digital keyboard system from telephone line inversion;

wherein said keyboard switching means includes key switches each associated with a decimal digit 0-9 and R and P key switches wherein a first operation of said R switch causes a previously dialed and engaged number to be stored by said pulse generator circuit means and a second operation of said R switch causes said stored number to be redialed and wherein a first operation of said P switch causes a number dialed during a telephone conversation to be stored by said pulse generator circuit means and a second operation of said P switch causes the telephone line to be cleared and the stored number dialed.

2. The digital keyboard system of claim 1 wherein said encoding logic circuit means includes an array of switch diodes and resistors for generating digit signals corresponding to each digit key switch depressed by the user, and for generating signals corresponding to said R and P key switches.

3. The decade digital telephone dial unit of claim 1 wherein said protection circuit means includes a diode bridge coupled across said telephone lines to allow operation of said digital keyboard system when said telephone lines are inverted and further includes zener diode means coupled across said bridge for holding substantially constant the load voltage in said lines and for protecting against overvoltage induced in said lines.

4. The decade digital telephone dial unit of claim 1 wherein said first electronic switching means includes a first high voltage switch transistor driven by a first Darlington pair of switch transistors for opening and closing said telephone lines.

5. The decade digital telephone dial unit of claim 1 wherein said second electronic switching means includes a second high voltage switch transistor driven by a second Darlington pair of switch transistors for opening and shorting said phonic section.

6. The decade digital telephone dial unit of claim 1 wherein said power supply means comprises:
DC/AC converter circuit means coupled to said telephone lines for producing an AC signal;
rectifier and filter circuit means coupled to said DC/AC converter for rectifying said AC signals to produce an intermediate DC voltage;
divider circuit means coupled to said DC/AC converter circuit means for dividing down the frequency of said AC signal;
voltage multiplier circuit means coupled to said divider and to said rectifier and filter circuit means for increasing the voltage of said intermediate DC voltage; to produce a multiplied DC voltage; and
filter circuit means coupled to said voltage multiplier for filtering said multiplied DC voltage, thereby providing power suitable for operating said digital keyboard system.

7. The decade digital telephone dial unit of claim 1 wherein said clock circuit means for generating time pulses comprises:
means for generating first and second streams of pulses having first and second phases $\phi_1$ and $\phi_2$, respectively, where $\phi_2$ is different from $\phi_1$.

8. The decade digital telephone dial unit of claim 1 wherein said pulse generator circuit means comprises:
input decoder and verifier circuit means coupled to said encoding logic circuit means for receiving said digit signals and for producing storage suitable signals corresponding to depressed digit key switches;
shift register storage circuit means coupled to said input decoder and verifier circuit means for storing said storage suitable signals;
anti-bounce logic circuit means coupling said digit signals from said encoding logic circuit means within said keyboard switching means to said input decoder and verifier circuit means for compensating for extraneous closings of said key switches;
control logic circuit means for generating an access pause signal for inhibiting the transmission of signals to said telephone line and for generating a redial operative signal for controlling disengagement of said digital keyboard system from said telephone lines;
output logic coupled to said shift register storage circuit means for generating output pulses related to telephone numbers to be transmitted to said telephone lines said output pulses being coupled to said electronic switching means for opening and closing said telephone lines.

9. The decade digital telephone dial unit of claim 8 further including means for receiving said redial operative signal from said pulse generator circuit means, said redial opeative signal corresponding to a condition in which a previously dialed number is to be transmitted to said telephone lines or in which a number is to be dialed from said key switches for transmission to said telephone lines, and generating a line disengagement signal coupled to said first Darlington pair of switch transistors for the ultimate disengagement of said telephone lines through said first high voltage switching transistor.

10. The decade digital telephone dial unit of claim 8 wherein said encoding logic circuit means includes means for generating a p signal in response to the activation of a said p key switch and further includes inhibit circuit means coupled to said p signal from said encoding circuit logic means and coupled to said access pause signal from said pulse generator circuit means for generating a pulse control signal coupled back to said pulse generator circuit means for controlling the transmission of pulses stored within said pulse generator circuit to said telephone lines.

11. The decade digital telephone dial unit of claim 8 wherein said encoding logic circuit means includes means for generating an r signal in rsponse to the activation of a said r key switch and further includes pulse control circuit means coupling said inhibit circuit means to said pulse generator circuit means and further coupled to said r signal from said encoding circuit logic means for activating the storage of digit signals within said pulse generator circuit means.

12. A decade digital telephone dial unit for substitution in a telephone having a rotary dialing system, conventional phonic section and handset actuated switch for coupling and decoupling said telephone with the telephone lines of a telephone system wherein said telephone is ready for use by virtue of its coupling to said telephone lines when said handset is removed from said telephone, comprising:
power supply means coupled to said telephone lines and receiving the electrical current conducted therethrough for converting said electrical current to voltages suitable for powering said decade digital telephone dial unit;
a keyboard system positionable in said telephone in place of said rotary dial, said keyboard system including a support base having a plurality of openings therein, a plurality of key switches each being associated with a decimal digit and each moveably positioned in an associated one of said openings, and encoding logic circuit means coupled to said key switches and having a plurality of electrical contacts thereon, said contacts being selectively closed by depression of selected ones of said key switches;

pulse generator circuit means coupled to said keyboard system for storing on command from the switching of the key switches of said keyboard system at least one stream of decimal digits corresponding to at least one telephone number, and for transmitting on command from said keyboard system said stored telephone number to said telephone lines in the form of pulses;

clock circuit means coupled to said pulse generator circuit means for generating basic timing pulses for synchronizing and controlling the operations of said pulse generator circuit means;

zero set marker means coupling said clock circuit means to said pulse generator circuit means for generating zero set markers to reset said pulse generator circuit means;

first electronic switching means for opening and closing said telephone lines for the transmission and reception of telephone numbers to and from said telephone lines in accordance with signals derived from said pulse generator circuit means;

second electronic switching means for muting said phonic section by shorting it in accordance with signals derived from said pulse generator circuit means;

protection circuit means coupled between said first and second electronic switching means and said telephone lines for protecting said digital keyboard system from telephone line inversion; and inhibit circuit means coupled between said clock circuit means and said pulse generator circuit and also coupled to said power supply means for inhibiting operation of said pulse generator circuit and hence the entire digital keyboard system when the level of voltage from said power supply means or the magnitude of said timing pulses are below predetermined levels.

13. A decade digital telephone dial unit for substitution in a telephone having a rotary dialing system, conventional phonic section and handset actuated switch for coupling and decoupling said telephone with the telephone lines of a telephone system wherein said telephone is ready for use by virtue of its coupling to said telephone lines when said handset is removed from said telephone, comprising:

power supply means coupled to said telephone lines and receiving the electrical current conducted therethrough for converting said electrical current to voltage suitable for powering said decade digital telephone dial unit;

a keyboard system positionable in said telephone in place of said rotary dial, said keyboard system including a support base having a plurality of openings therein, a plurality of key switches each being associated with a decimal digit and each movable positioned in an associated one of said openings, and encoding logic circuit means coupled to said key switches and having a plurality of electrical contacts thereon, said contacts being selectively closed by depression of selected ones of said key switches;

pulse generator circuit means coupled to said keyboard system for storing on command from the switching of key switches of said keyboard system at least one stream of decimal digits corresponding to at least one telephone number, and for transmitting on command from said keyboard and for transmitting on command from said keyboard system said stored telephone number to said telephone lines in the form of pulses;

clock circuit means coupled to said pulse generator circuit means for generating basic timing pulses for synchronizing and controlling the operations of said pulse generator circuit means;

zero set marker means coupling said clock circuit means to said pulse generator circuit means for generating zero set markers to reset said pulse generator circuit means;

first electronic switching means for opening and closing said telephone lines for the transmission and reception of telephone numbers to and from said telephone lines;

second electronic switching means for muting said phonic section by shorting it in accordance with signals derived from said pulse generator circuit means;

protection circuit means coupled between said first and second electronic switching means and said telephone lines for protecting said digital keyboard system from telephone line inversion;

a display counter coupled to said pulse generator circuit means for converting signals from said pulse generator circuit means into signals suitable for display storage;

display counter zero set generator means coupling said zero set marker to said display counter for generating display counter zero set signals;

a memory register coupled to said display counter for storing in sequence according to a first code signals from said display counter;

a decoder coupled to said memory register for converting signals stored in said first code within said memory register to signals having a second code said signals having said second code suitable for display;

a display coupled to said decoder for converting said signals having said second code into optical signals; and a shift register coupling said memory register to said decoder for transferring data to said decoder for ultimate display substantially simultaneously with the transfer of data into said memory register from said display counter, wherein said display, said display counter, said memory register and said shift register are powered by said power supply means.

14. The decade digital telephone dialing unit of claim 13 wherein said keyboard switching means includes key switches each associated with a decimal digit 0-9 and R and P key switches wherein a first operation of said R switch causes a previously dialed and engaged number to be stsored by said pulse generator circuit means and a second operation of said R switch causes said stored number to be redialed and wherein a first operation of said P switch causes a number dialed during a telephone conversation to be stored by said pulse generator circuit means and a second operation of said P switch causes the telephone line to be clearled and the stored number dialed.

15. The decade digital telephone dialing unit of claim 14 wherein said encoding logic circuit means includes an array of switch diodes and resistors for generating digit signals corresponding to each digit key switch depressed by the user, and for generating r and p signals corresponding to said R and P key switches.

16. The decade digital telephone dialing unit of claim 13 wherein said protection circuit means includes a diode bridge coupled across said telephone lines to allow operation of said digital keyboard system when said telephone lines are inverted and further includes zener diode means coupled across said bridge for holding substantially constant the load voltage in said lines and for protecting against over voltages induced in said lines.

17. The decade digital telephone dialing unit of claim 13 wherein said first electronic switching means includes a first high voltage switch transistor driven by a first Darlington pair of switch transistors for opening and closing said telephone lines.

18. The decade digital telephone dialing unit of claim 13 wherein said second electronic switching means includes a second high voltage switch transistor driven by a second Darlington pair of switch transistors for opening and shorting said phonic section.

19. The decade digital telephone dialing unit of claim 13 wherein said power supply means comprises:
DC/AC converter circuit means coupled to said telephone lines for producing an AC signal;
rectifier and filter circuit means coupled to said DC/AC converter for rectifying said AC signals to produce an intermediate DC voltage;
divider circuit means coupled to said DC/AC converter circuit means for dividing down the frequency of said AC signal;
voltage multiplier circuit means coupled to said divider and to said rectifier and filter circuit means for increasing the voltage of said intermediate DC voltage; to produce a multiplied DC voltage; and
filter circuit means coupled to said voltage multiplier for filtering said multiplied DC voltage, thereby providing power suitable for operating said digital keyboard system.

20. The decade digital telephone dialing unit of claim 13 wherein said clock means for generating time pulses comprises:
means for generating a first stream of pulses having a first phase $\phi_1$; and
means for generating a second stream of pulses having a second phase $\phi_2$ different from $\phi_1$.

21. The decade digital telephone dialing unit of claim 13 wherein said pulse generator circuit means comprises:
input decoder and verifier circuit means coupled to said encoding logic circuit means for receiving said digit signals and for producing storage suitable signals corresponding to depressed digit key switches;
shift register storage circuit means coupled to said input decoder and verifier circuit means for storing said storage suitable signals;
anti-bounce logic circuit means coupling said digit signals from said encoding logic circuit means within said keyboard switching means to said input decoder and verifier circuit means for compensating for extraneous closings of said key switches;
control logic circuit means for generating an access pause signal for inhibiting the transmission of signals to said telephone line and for generating a redial operative signal for controlling disengagement of said digital keyboard system from said telephone lines;
output logic coupled to said shift register storage circuit means for generating output pulses related to the telephone numbers to be transmitted to said telephone lines said output pulses being coupled to said electronic switching means for opening and closing said telephone lines.

22. The decade digital telephone dialing unit of claim 17 further including means for receiving said redial operative signal from said pulse generator circuit means said redial operative signal corresponding to a condition in which a previously dialed number is to be transmitted to said telephone lines or in which a number is to be dialed from said key switches for transmission to said telephone line, and generating a line disengagement signal coupled to said first Darlington pair of switch transistors for the ultimate disengagement of said telephone lines through said first high voltage switching transistor.

23. The decade digital telephone dialing unit of claim 17 wherein said encoding logic circuit means includes means for generating a p signal in response to the actuation of a first predetermined key switch and further includes inhibit circuit means coupled to said p signal from said encoding circuit logic means and coupled to said access pause signal from said pulse generator circuit means for generating a pulse control signal coupled back to said pulse generator circuit means for controlling the transmission of pulses stored within said pulse generator circuit to said telephone lines.

24. The decade digital telephone dialing unit of claim 17 wherein said encoding logic circuit means includes means for generating an r signal in response to the actuation of a second predetermined key switch and further includes pulse control circuit means coupling said inhibit circuit means to said pulse generator circuit means and further coupled to said r signal from said encoding circuit logic means for activating the storage of digit signals within said pulse generator circuit means.

25. A decade digital telephone dial unit for substitution in a telephone having a rotary dialing system, conventional phonic section and handset activated switch for coupling and decoupling said telephone with the telephone lines of a telephone system wherein said telephone is ready for use by virtue of its coupling to said telephone lines when said handset is removed from said telephone comprising:
power supply means coupled to said telephone lines and receiving the electrical current conducted therethrough for converting said electrical current to voltages suitable for powering said decade digital telephone dial unit;
a keyboard system positionable in said telephone in place of said rotary dial, said keyboard system including a support base having a plurality of openings therein, a plurality of key switches each being associated with a decimal digit and each moveably positioned in an associated one of said openings, and encoding logic circuit means coupled to said key switches and having a plurality of electrical contacts thereon, said contacts being selectively closed by depression of selected ones of said key switches;

pulse generator circuit means coupled to said keyboard system for storing on command the switching of the key switches of said keyboard system at least one stream of decimal digits corresponding to at least one telephone number, and for transmitting on command from said keyboard system said stored telephone number to said telephone lines in the form of pulses;

clock circuit means coupled to said pulse generator circuit means fore generating basic timing pulses for synchronizing and controlling the operations of said pulse generator circuit means;

zero set marker means coupling said clock circuit means to said pulse generator circuit means for generating zero set markers to reset said pulse generator circuit means;

first electronic switching means for opening and closing said telephone lines for the transmission and reception of telephone numbers to and from said telephone lines second electronic switching means for muting said phonic section by shorting it in accordance with signals derived from said pulse generator circuit means;

protection circuit means coupled between said first and second electronic switching means and said telephone lines for protecting said digital keyboard system from telephone line inversion;

a display counter coupled to said pulse generator circuit means for converting signals from said pulse generator circuit means into signals suitable for display storage;

display counter zero set generator means coupling said zero set marker to said display counter for generating display counter zero set signals;

a memory register coupled said display counter for storing in sequence according to a first code signals from said display counter;

a decoder coupled to said memory register for converting signals stored in said first code within said memory register to signals having a second code said signals having said second code suitable for display;

a display coupled to said decoder for converting said signals having said second code into optical signals;

a shift register coupling said memory register to said decoder for transferring data to said decoder for ultimate display substantially simultaneously with the transfer of data into said memory register from said display counter; and inhibit circuit means coupled between said clock circuit means and said pulse generator circuit and also coupled to said power supply means for inhibiting operation of said pulse generator circuit and hence the entire digital keyboard system when the level of voltage from said power supply means or the magnitude of said timing pulses are below predetermined levels.

* * * * *